(12) United States Patent
Bockman et al.

(10) Patent No.: US 6,178,008 B1
(45) Date of Patent: Jan. 23, 2001

(54) CONSTRUCTING DEVICE-STATE TABLES FOR INKJET PRINTING

(75) Inventors: Francis E. Bockman; Guo Li, both of San Diego, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 08/960,766

(22) Filed: Oct. 30, 1997

(51) Int. Cl.$^7$ ................................................. G06K 15/00
(52) U.S. Cl. ............................................... 358/1.9; 358/1.1
(58) Field of Search .................................... 345/101–117; 358/261.4, 296, 298, 500, 501–505, 512–526, 530, 534, 1.1, 1.2, 1.3, 1.4, 1.5, 1.6, 1.7, 1.8, 1.9, 1.11, 1.12, 1.13, 1.14, 1.15, 1.16, 1.17, 1.18; 702/85

(56) References Cited

U.S. PATENT DOCUMENTS

| | | | |
|---|---|---|---|
| 4,481,532 | * 11/1984 | Clark et al. | 358/519 |
| 5,331,440 | 7/1994 | Kita et al. | 358/529 |
| 5,363,318 | * 11/1994 | McCauley | 702/85 |
| 5,386,305 | 1/1995 | Usami | 358/518 |
| 5,406,315 | * 4/1995 | Allen et al. | 358/518 |
| 5,425,134 | 6/1995 | Ishida | 395/109 |
| 5,528,377 | * 6/1996 | Hutcheson | 358/298 |
| 5,528,386 | * 6/1996 | Rollerston et al. | 358/522 |
| 5,625,557 | * 4/1997 | Colosky | 701/35 |
| 5,657,137 | 8/1997 | Perumal, Jr. | 358/502 |
| 5,719,956 | 2/1998 | Ogatsu et al. | 382/167 |
| 5,737,453 | 4/1998 | Ostromoukhov | 382/275 |
| 5,739,917 | 4/1998 | Shu et al. | 358/298 |
| 5,742,405 | 4/1998 | Spaulding et al. | 358/456 |
| 5,795,082 | * 8/1998 | Shimada et al. | 400/120.09 |
| 5,805,178 | 9/1998 | Silverbrook et al. | 347/15 |
| 5,809,181 | 9/1998 | Metcalfe | 382/276 |
| 5,857,063 | 1/1999 | Poe et al. | 395/109 |
| 5,861,896 | 1/1999 | Barton et al. | 347/15 |
| 5,892,891 | * 4/1999 | Dalal et al. | 358/1.9 |

* cited by examiner

Primary Examiner—Arthur G. Evans

(57) ABSTRACT

An automatic system forms color LUTs (or LUT-forming data) for automated reference—typically in error diffusion (ED). A first aspect is for printers with six or more colorants. Three ramps, for different basic colorants, are photometrically measured; mainly just those results yield a transform from 3D color to system colorants. In a second aspect, some device-state candidate colors are chosen for black replacement. In a variant the choice is subject to (1) maintaining some chromatic colorant in each pixel with black; or (2) modifying use patterns to avoid alternative use of composite black vs. black; or (3) adjustments to allow for composite nonequivalence to black. A related third aspect allows replacement only if there is a given minimum amount of composite. In a fourth aspect, candidate states are dropped that have small changes in number of quanta per pixel, or no companion light colorant quantum with each dark one, best eliminating those with too many quanta of each or all colorants. In a related fifth aspect, one state is assigned to each major entry based on, at a gamut surface except at the dark end, favoring states nearer the surface over those nearer a desired major entry; and at the neutral axis, especially its dark end, favoring real black. Other assigning is best done by entry nearness. In a sixth aspect preferably 1D LUTs are formed for finding major entries based on an input-color spec, not monotonic in entry assignment to indices; precomputed ED distributions attach to indices. In a seventh aspect a state LUT formed to access states based on input specs is used to print nominal neutral colors and measured results used to adjust access. In an eighth facet related to the first, the ramps correspond to fundamental combinations of single colorants, e. g. secondaries.

67 Claims, 6 Drawing Sheets

Microfiche Appendix Included
(2 Microfiche, 138 Pages)

| $C_D$ ink | $C_L$ ink | color number | L* value | C value |
|---|---|---|---|---|
| 0 | 0 | 0 | 94.6 | 0 |
| 0 | 1 | 1 | 88.1 | 36 |
| 0 | 2 | 2 | 83.3 | 63 |
| 0 | 3 | 3 | 80.4 | 79 |
| 0 | 4 | 4 | 77.2 | 97 |
| 1 | 0 | 5 | 69.3 | 141 |
| 1 | 1 | 6 | 68 | 148 |
| 1 | 2 | 7 | 66.6 | 156 |
| 1 | 3 | 8 | 65.2 | 164 |
| 1 | 4 | 9 | 63.2 | 175 |
| 2 | 0 | 10 | 60.2 | 191 |
| 2 | 1 | 11 | 59.6 | 195 |
| 2 | 2 | 12 | 58.3 | 202 |
| 2 | 3 | 13 | 56.6 | 212 |
| 2 | 4 | 14 | 55.6 | 217 |
| 3 | 0 | 15 | 53.4 | 229 |
| 3 | 1 | 16 | 52.4 | 235 |
| 3 | 2 | 17 | 51.8 | 238 |
| 3 | 3 | 18 | 51.6 | 239 |
| 3 | 4 | 19 | 51.75 | 239 |
| 4 | 0 | 20 | 48.9 | 255 |
| 4 | 1 | 21 | 48.8 | 255 |
| 4 | 2 | 22 | 48.8 | 255 |
| 4 | 3 | 23 | 48.6 | 256 |
| 4 | 4 | 24 | 47.75 | 261 |

FIG. 4

CONSTRUCTING DEVICE-STATE TABLES FOR INKJET PRINTING

RELATED DOCUMENTS

Closely related patent documents include other, co-owned U.S. utility-patent applications filed in the United States Patent and Trademark Office substantially concurrently with this document. One is in the names of Francis E. Bockman and Guo Li, and identified as Hewlett Packard Company, and entitled "DEVICE STATE ERROR DIFFUSION TECHNIQUE FOR HALFTONING"—and subsequently assigned utility-patent application Ser. No. 08/960,779, and issued as U.S. Pat. No. 6,081,344 on Jun. 27, 2000. Another such document is in the names of Kevin R. Hudson and Thomas B. Pritchard, and identified as Hewlett Packard Company, and entitled "TABLE BASED FAST ERROR DIFFUSION HALFTONING TECHNIQUE"—and subsequently assigned utility-patent application Ser. No. 08/961,047, and issued as U.S. Pat. No. 6,057,933 on May 2, 2000. A third related document filed Jan. 28, 1997, is U.S. patent application Ser. No. 08/789,859 in the name of Irene Heitsch and entitled "IMAGE RENDITION BY PLURAL-ROW ERROR DIFFUSION, FOR FASTER OPERATION AND SMALLER INTEGRATED CIRCUITS"—and subsequently issued as U.S. Pat. No. 5,974,228 on Oct. 26, 1999. Other related documents are U.S. Pat. Nos. 5,070,413, in the names of James R. Sullivan, Rodney L. Miller and Thomas J. Wetzel and entitled "COLOR DIGITAL HALFTONING WITH VECTOR ERROR DIFFUSION"; 5,333,243, in the names of Jeffrey S. Best and Paul H. Dillinger and entitled "METHOD FOR FORMING COLOR IMAGES, USING HUE-PLUS-GRAY COLOR MODEL AND ERROR DIFFUSION"; 5,473,446, in the names of Alexander Perumal, Jr. and Paul H. Dillinger and entitled "COLOR DIGITAL HALF-TONING USING BLACK AND SECONDARY COLOR REPLACEMENT AND COLOR VECTOR DITHERING"; 5,594,481, in the name of Brian J. Keefe and entitled "INK CHANNEL STRUCTURE FOR INKJET PRINTHEAD"; and 5,621,545 in the names of Ricardo J. Motta and Gary J. Dispoto and entitled "IMAGE PRODUCTION USING COLOR ERROR DIFFUSION". Other relevant documents include Robert Ulichney, *Digital Halftoning* (MIT 1987, 1993), and particularly the discussion of three-dimensional vector-based error diffusion in that work; and Toshiro Terano, Kiyoji Asai, and Michio Sugeno, *Fuzzy Systems Theory and Its Applications* (Ohmsha, Tokyo 1987 [in Japanese]; Academic Press 1992), and particularly chapter 2, "The Basics of Fuzzy Theory" at 19–39, and chapter 8, "Evaluation" at 137–45. All of the documents mentioned above are hereby incorporated by reference in their entirety into this document.

MICROFICHE APPENDIX

An Appendix to this document consists of two device-state tabulations and a coversheet, running to a total 138 aggregate frames and representing data for two different printing media. The tabulations are explained at the end of the disclosure portion of this document.

FIELD OF THE INVENTION

This invention relates generally to machines and procedures for printing text or images (whether photo-like pictorial images or commercial-style graphics such as charts, graphs, color bands behind text, etc.) from individual colorant quanta, such as (e. g. in inkjet printing) ink spots, created in a two-dimensional pixel array on a printing medium such as paper, transparency stock, or other glossy media. The invention relates more particularly to preliminary procedures that prepare data assemblages for later use in guiding the operation of a printing machine and method, such as for example an inkjet machine and method, and most particularly to formation of lookup tables that enable such a machine and method to select inkdrop or other colorant combinations quickly, efficiently and ideally. The invention was made for use in printing by error-diffusion techniques.

In most of this document, merely for definiteness and for relative simplicity of language, the invention and its environment are described in terms of inkjet printing, inkdrops etc. It is to be understood, however, that such wording is for convenience and for tutorial purposes only, and that the invention and the appended claims are not thus limited but rather are more generally applicable to other kinds of printing technologies, colorants, and colorant quanta.

DEFINITIONS

For purposes of this document, particularly including the appended claims, the following special meanings are to be understood throughout.

The term "palette" means all available colors which a printing device or system—as actually configured for operation, taking into consideration all inherent limitations and purposefully imposed constraints of hardware, firmware and software—can print in one individual pixel by depositing an inkdrop or combinations of inkdrops in that pixel. (By this definition, there is no such thing as an unavailable color in a machine palette unless two different machines are under consideration at the same time.)

A "drop set" is a one-dimensional combination of primary-color inkdrops (including zero or one drop) that can be deposited in one pixel. In a system which uses inks that are plural different densities or dilutions of a common basic ink color—for instance dark cyan drops and light cyan drops—a drop set may consist of zero or more drops of each of the plural densities or dilutions of that common ink color, e. g. one dark cyan drop plus three light cyan drops.

"Ramp" means a series of drop sets of a common basic ink color that are arranged in a substantially monotonic sequence by some color parameter such as lightness.

A "drop-set combination" is a two- or three-dimensional combination of, respectively, two or more drop sets. For example a particular drop-set combination may consist of two dark cyan drops plus one light cyan drop, plus three dark magenta drops and two yellow drops; or may consist of all those plus a black drop; or may consist of one yellow drop (since magenta, cyan and black drop sets may be zero); or may consist of no drops at all (since each one of three or four different drop sets may be zero); or may consist of four black drops only.

A "device state" is a drop-set combination that has been designated for inclusion in the palette of a certain printing device. (By this definition, there is no such thing as a "prohibited device state"—rather, prohibited drop-set combinations simply are not device states.)

A "color number" is a tag or code number that identifies a particular drop set within a ramp. Our color numbers have a very simple physical meaning:

for basic ink colors in which only one darkness or dilution is used, the color number is simply the number of inkdrops of that color (or for certain purposes a multiple of that number of drops, as will be seen); and for basic ink colors in which light and dark drops are used together, the color number is the number of light drops plus a selected constant times the number of dark drops.

The constant is nominally equal to the number of light-drop states (e.g. five, including the state "zero"). For certain purposes it is preferable to offset the color-number values by one, so that the range begins with one rather than zero, as will be seen. We have found it preferable to avoid attaching any deeper significance to the color number, although intuitively it may seem appealing to say that, for instance, it represents the number of all light drops that would have the same lightness—subject to an assumption about equivalence between one dark drop and some number of light drops. Since lightness (or darkness) is not truly linear in ink loading, the above-mentioned "physical meaning" of the color number is not quantitative lightness as such, but will be related to lightness empirically. As examples, in a machine that will be allowed to print up to four drops of any ink in any pixel: (1) if only one darkness of yellow ink will be used, a color number for yellow may be any number from zero through four (or if preferred one through five); (2) if two different dilutions of cyan ink will be used, the color number for cyan is defined as $nC_D+C_L$, where the constant n is at least preferably an integer. If we select the constant n=5, then the color number is $5C_D+C_L$ and may take on any value from zero through twenty-four. Again, we advise against the temptation to identify one dark cyan drop $1C_D$ as nominally equivalent in lightness to five light cyan drops $5C_L$ (i. e., to write $1C_D \equiv 5C_L$), since any such equivalency is at best only roughly correct very close to one end of a ramp (e. g., for very small color numbers), and fails dramatically elsewhere. Using these examples, a color number of "zero" means no drop of either dilution. Correspondingly a cyan color number of "twenty-four" identifies the maximum allowable pixel load of cyan, namely four drops of dark cyan $4C_D$ plus four drops of light cyan $4C_L$—because there are twenty-four possible nonzero combinations of two inks with five states each. (Alternatively the color-number range can be restated or redefined as one through twenty-five if preferred.)

An "index" (plural "indices") is a one-dimensional color-coordinate value that is used to find an entry in a run-time color lookup table, based upon an input color specification that has been received or generated. For instance in a three-dimensional machine or perceptual space such as a cyan-magenta-yellow space, an index may be an individual C, M, or Y number on a 0-to-255 scale. Thus an index may be one building-block or element of a one-dimensional lookup table, or (if concatenated with other indices, for other color dimensions) a lookup table of more than one dimension. Intuitively an "index" is related to a "color number" in the sense that each represents a point in a one-dimensional color scale, but as a practical matter the two are very different: an index represents a one-dimensional color on a near-continuum that approximates the whole range of possible values along a color axis, and is used at run time during operation of a printer, after lookup table construction is complete—whereas a color number is a uniquely quantized label for a particular closely defined drop set, and is used only early-on in the process of constructing color-lookup tables. In addition the two are used (or are "read") in opposite directions: the index at run time to help find a drop-set combination by its already-associated color specification, and the color number derived from a drop set to identify the drop set and so facilitate initial association of a color specification.

An "entry" is a triad of respective indices for three color dimensions—for example a triplet of CMY or RGB numbers on a 0–255,0–255,0–255 scale, or a triplet of La*b* numbers in a CIELAB space, or a triplet of hnk numbers in hue-plus-gray space. In a theoretical sense each entry is therefore associated with at least one drop-set combination—but because not every combination is in a particular palette, there is no "association" in the practical sense of a connection that operates directly to call up a particular drop-set combination at run time. Each entry is a node, or a three-way intersection of points, in a fine grid (whether Cartesian, polar or otherwise) in color space.

A "black-replacement combination" is a drop-set combination formed by substituting black ink for composite black. At least some entries can be reassociated with corresponding black-replacement (KR) combinations, rather than original or fundamental drop-set combinations.

A "major entry" is one of an array of selected spaced-apart entries—for instance, coarse-scale CMY numbers on a 0–16,0–16,0–16 scale, where "16" represents the darkest available color of each ink, respectively. Another equivalent example is numbers on a 0–255,0–255,0–255 scale in which the only values permitted are certain spaced-apart values such as 0, 16, 32, 48 . . . 240, 255. In practice each major entry is a node, or a three-way intersection of points, in a coarse grid in color space.

The present invention provides ways of forming lookup tables that a printer can use automatically in selecting a device state based upon input of a color specification—usually either through the intermediary of a group of indices that are related to the input specification, or through the intermediary of an entry that is related to the input specification, or both.

BACKGROUND OF THE INVENTION (a) Multiink systems—A new class of photographic inkjet printers uses multiple inks. For instance instead of the traditional four inks (cyan, magenta, yellow and black, symbolized CMYK) a printer may carry six inks, including two densities, dilutions or shades of cyan and magenta inks.

Neither of the two new cyan inks is exactly the same density etc. as the traditional cyan C; and neither magenta ink is the same as traditional magenta M. To distinguish symbolically between the light and dark cyan and magenta inks in such a printer, this document uses the notations $C_L$, $C_D$, $M_L$ and $M_D$ respectively. Thus the full complement of available inks is denoted $C_L C_D M_L M_D YK$.

The new generation of multiink machines is also distinctive in (1) permitting greater numbers of inkdrops per pixel as a matter of routine, and (2) seeking to perform halftoning (particularly error diffusion) based upon a full color specification or vector, rather than channel by channel.

In previous inkjet printers, generally the number of inkdrops heretofore employed at each pixel is very constrained: at first, two primary-ink drops were used only to form secondary colors (e. g. red, green and blue RGB), and more recently limited usage of two or three drops on a single pixel has been permitted for better saturation or more consistent effects between colors (particularly on nonabsorbent printing media such as transparencies for overhead projection, and other special-use plastic media).

As to halftoning, heretofore in most systems input color values if received or generated in terms of RGB are first converted to CMY; the CMY data are converted to CMYK, and each of the four color signals are halftoned separately to establish amounts of the corresponding four inks to print for each pixel. A partial relaxation of this regimen is developed in the above-mentioned patents of Best and Dillinger, Perumal and Dillinger, Motta and Dispoto, and Sullivan et al.

The new systems to a great extent cast aside both these earlier constraints. Even though the number of visually distinguishable colors that can be made with these systems is still several orders of magnitude smaller than available with a device (such as a cathode ray tube) that has nearly continuous control in three color dimensions, nevertheless the new ink technology opens enormous new capabilities for production of both subtle and rich color effects at astonishingly low cost and with remarkable speed. Halftoning and color control, however, become monumentally more complex and challenging.

Optimizing ink usage per pixel, constraining colors to a maximum number of drops per pixel, making fullest use of the capability of multiink, multidrop systems to produce a reasonably complete gamut—with smooth-appearing color gradations—and minimizing graininess are all new goals. In addition, developing an algorithm that is amenable to a hardware implementation is important for fully adequate speed or image throughput.

(b) Error diffusion—This topic has been extensively elaborated in both the nonpatent and patent literature, as for instance in the above-mentioned references of Ulichney, Heitsch (a four-color implementation), Sullivan et al., and Motta et al. Furthermore the application of the present invention to error diffusion in multiink, multidrop systems is described and explained in our own above-mentioned concurrently filed patent document "Device State Error Diffusion Technique for Halftoning".

That document shows that the present invention enables performance of error diffusion both very efficiently and, if preferred, wholly in a full-color space. Even propagated "error" signals can, if desired, be distributed out of that process to only the basic three-dimensional color coordinates (not all of the multiple ink channels). In this document we therefore refrain from dwelling on the characteristics or operation of error-diffusion systems.

(c) Systems based on full-palette measurement—It is noteworthy that heretofore efforts to deal with the great new expanse of capabilities in multiink, multidrop systems have focused upon characterizing the entire printer palette systematically at the outset through relatively exhaustive photometric work. This is particularly so, for instance, with respect to Motta, mentioned above—which also emphasizes performance of such characterization in a perceptual space as for instance through conversion of initial color data from RGB to the familiar CIELAB coordinates.

We by no means intend to disparage the very fine work of Motta and Dispoto; their guidelines appear insightful, reasonable and all but guaranteed to yield both excellent color performance, in terms of image quality, and a thorough understanding of that performance. What has been unexpected and somewhat mystifying about that approach, however, is that the relatively great initial investment in a careful measurement phase has not appeared to be repaid in terms of either ultimate quality or comprehension.

In our efforts to apply such a recipe to a pragmatic regime of multiink, multidrop color printing, much to our surprise we achieved only relatively poor gradations, leading to contouring, and even slight errors in sequencing. These errors were especially troublesome in attempting to reproduce slow continuous gradations in an input image.

Initially we found these effects baffling. Only as a result of our own work as set forth in other parts of this document have we begun to understand how it is that such insidious problems manage to creep into a seemingly failure-proof and rigorously analytical, systematic approach.

Moreover, in Motta all color corrections or conversions are built into device-state tables, leading as a practical matter to inseparability of color matching from error diffusion. While this consolidation is in principle very efficient and useful, it introduces undesirable complexity—and in particular delay—into the common task of printing objects of various different types and characteristics within a single page.

(d) Other earlier efforts of present inventors—In addition to the work discussed above we have also personally explored several other measurement-based strategies. In one such effort, we developed measurements in CIELAB of three to four hundred tiles, manipulated the results to express the measurements in terms of an XYZ-like space, and then further manipulated those values to reach CMY coordinates. Results for this work were analogous to the problems discussed above, as were still others in an exploration based on the hue-plus-gray or hnk space.

Another program of particular interest explored independent-channel error diffusion in a six-ink proportional system: this method worked rather well in terms of gradation smoothness and monotonicity—and hence absence of contouring—as well as speed. Because of the independent channels, however, liquid control was lacking.

As will be detailed below, we have found that control and per-pixel balance of liquid loading exert a remarkably great influence on granularity, smoothness of gradations, and even colorimetric accuracy. These effects are in addition, of course, to the more widely and historically recognized gross effects of excessive or irregular liquid load on printing-medium drying time, local distortion, blocking and offset. We have therefore rejected the appeal of independent-channel processing.

It will be understood that much of the foregoing discussion deals with work done heretofore, by the present inventors and by others, that is not prior art with respect to the present invention.

(e) Conclusion—Heretofore such limitations of stratagems for establishing and controlling printer palettes have continued to impede achievement of uniformly excellent multiink, multidrop inkjet printing—at high throughput—on all industrially important printing media. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, though they are preferably employed together to optimize their benefits. Generally in common to all its aspects or facets, the invention is a procedure—or overlapping group of procedures—for forming color lookup tables for automated reference by a computerized system. Our invention also encompasses the lookup tables formed by that procedure or those procedures.

Such automated reference occurs in the course of printing desired color images on a printing medium by construction from individual marks formed in pixel arrays. Such construction from individual marks is effectuated by a printer.

Also generally common to all the facets or aspects is a procedural step that is generally undertaken as the final step of the procedure. This step is storing the results of the other procedural steps, most commonly in nonvolatile memory.

It will be understood throughout this document that the storing step may equivalently include either storing the transform as a color lookup table, or storing the transform as an information file from which a color lookup table can be formed automatically. Preferably though not necessarily, the stored results of our inventive procedure are for use in error diffusion; it will be clear that the methods of our invention provide a transform between input and output spaces that in various circumstances may have other or more general application.

Furthermore, still referring to general properties of our invention rather than the independent facets mentioned above, at least the actively developmental steps of our procedure are preferably performed substantially automatically by an automatic processor, such as merely by way of example a programmed digital processor in a programmed computer. We found it far more fruitful to manipulate, refine and rerun the algorithms of our procedure, when any deficiency in output halftoned results appeared, than to massage individual color points after the algorithms had done their work. As a result it is now possible to rely upon the algorithms in all but the most peculiar of cases.

Now we shall take up in turn the several independent aspects of our invention. In preferred embodiments of a first of its facets or aspects, the invention is for use with a printer having a colorant (e.g. ink) system of six or more colorants.

The procedure includes the step of printing and photometrically measuring three ramps for respectively different basic colorant colors available in the printer. The procedure also includes the step of using substantially exclusively the ramp photometric measurements to establish at least an initial version of a transform from three-dimensional color coordinates to the six-or-more-colorant system in the printer.

By the phrase "using substantially exclusively" we do not mean to exclude additional steps of preparation, refinement, etc.—but rather only to exclude the use of substantial additional amounts of photometric data. In particular our method of this first independent aspect of the invention does not make use of measurements finely stepped throughout, or even generally scattered across, the entire palette.

Rather, measurements are substantially constrained to the use of actual photometric data taken along three principal axes of a color-coordinate system in its most pragmatic form, namely the system defined by the three basic colorant colors and by simple ramps using the available drop sets.

By the term "substantially" we mean to encompass taking and using data for a small number of additional, supplemental colorant-set combinations that sometimes can be helpful in bringing the results of our procedure to convergence quickly, but are not critical to eventual print quality etc. These points correspond to either (1) black or (2) substantially pure secondary colors (e. g., RGB in a CMY system). In this case the using step employs exclusively the previously mentioned ramp photometric measurements and the supplemental photometric measurements to complete—as noted above—at least an initial version of the transform.

By "pure secondary colors" we mean nominally one-to-one combinations of colorants of the different basic colorants, such as for example $4C_D 4C_L 4M_D 4M_L$—perhaps the most highly saturated available blue. For red and green, very slightly less-saturated forms may be used, since available one-to-one-balanced pure-secondary combinations may be limited to, say, the dark equivalents as in (for green) $4C_D 4Y$ in a printer having only one dilution of yellow. By "black" we mean a darkest available balanced three-way combination such as $4C_D 4M_D 4Y$.

If desired, additional information for more-complete secondary or gray ramps may be used too, as for instance in a blue ramp $C_L M_L$, $2C_L 2M_L$, $3C_L 3M_L$, $4C_L 4M_L$, $C_D M_L$, $C_D C_L M_D M_L$, $C_D 2C_L M_D 2M_L$; or in a gray ramp $C_D M_D Y$, $2C_D 2M_D 2Y$ and $3C_D 3M_D 3Y$. Even in this case, however, as will be recognized the amount of information collected is far less than in a full-gamut characterizing measurement system.

The foregoing may constitute a description or definition of the first facet of the invention in its broadest or most general form. Even in this general form, however, it can be seen that this aspect of the invention significantly mitigates the difficulties left unresolved in the art.

In particular, as will be seen, somewhat astonishingly the results of these seemingly oversimplistic measurements are developed according to our invention into a palette-control regime that is markedly superior to that available from a full-sampling photometric scheme such as those discussed above. In particular the superiority of the resulting system is felt in terms of gradation smoothness, absence of contouring, fine granularity, colorimetric accuracy and in liquid-colorant (e. g. ink) systems most especially excellent liquid control, as well as other advantages that will be introduced below.

Although this first aspect of the invention in its broad form thus represents a significant advance in the art, it is preferably practiced in conjunction with certain other features or characteristics that further enhance enjoyment of overall benefits.

For example, it is preferred that the procedure also include the steps of using the previously mentioned complete "initial version" of the transform to print a series of substantially neutral (i. e., nonchromatic or nominally gray-scale) colors, and photometrically measuring that printed series. In addition the preferred procedure also includes using these measurements to refine the transform.

Even this additional refinement stage does not canvass the entire gamut or palette in any even remotely comprehensive way, but only fine-tunes the results along the neutral axis. Furthermore, this refinement stage is not strictly necessary for reasonable accuracy of neutral run-time output colors when—as is most commonly the case—color correction or conversion is activated upstream of the halftoning processes that rely upon our tables.

Rather, the refinement stage primarily addresses the desirability of being able to produce a reasonably accurate neutral ramp with the color tables (or other color-correction module) turned off. The refinement stage does, however, effect an additional noticeable improvement in run-time accuracy of neutral colors when color correction is turned on.

Another preference relates to formulating the subsystem for accessing our completed color-lookup tables. We shall not present in this section all the additional procedure details, but only note that this part of our invention establishes indices related to each of three independent color coordinates respectively—and uses these in constructing an auxiliary tabulation or tabulations which the printer uses to access or enter the main tables.

We have discovered that particularly important benefits accrue from making that tabulation not monotonic with respect to indices, or the resulting nearby "entries" (see Definitions section above). This aspect of our invention is distinctly counterintuitive, because a person of ordinary skill in this field would normally suppose that monotonic input tabulation would be a crucial ingredient for smooth and monotonic halftoned output colors. Notably, when the tables constructed according to our present invention are used in conjunction with the error-diffusion methods described in our companion document "Device State Error Diffusion Technique for Halftoning", precisely the contrary is true.

As will be seen in later discussion of another independent aspect of the invention, our invention also encompasses an alternative way of assembling sufficient information to construct the transform. That alternative is to measure and use substantially exclusively a secondary ramp—rather than a primary ramp as specified above for the first facet of the invention.

Preferred embodiments of a second aspect of the invention, in its most general or broad form, include (in addition to the common features mentioned earlier) the step of establishing a multiplicity of colorant-set combinations as candidates for selection to serve as device states. Another step is forming black-replacement combinations from at least some of the colorant-set combinations. In one variant of this second facet of the invention, the multiplicity of candidate drop-set combinations includes all possible color combinations in a set of substantially different colors. In another variant of this second aspect of the invention, the replacement-combination-forming step is subject to either or both of two conditions.

One of those conditions is maintaining an amount of chromatic colorant, ideally light colorant, in each pixel with black colorant; the other condition is modification of usage patterns to avoid alternative usage of composite black vs. black colorant. Another step is selecting some of the black-replacement combinations and some other ones of the colorant-set combinations to serve as device states.

The foregoing may constitute a description or definition of the second facet of the invention in its broadest or most general form. Even in this general form, however, it can be seen that this aspect of the invention too significantly mitigates the difficulties left unresolved in the art.

In particular, we have found that the first of these black-replacement rules is extremely helpful in maintaining smooth transitions and blending differently colored pixels; it appears that this benefit arises through diffusion of the black colorant by the lighter color. This observation is only the first of several elements of our invention that relate to close control of liquid loading—with respect to loading at adjacent pixels. (As will be seen, this first condition also helps to implement another operating criterion discussed below, namely avoidance of abrupt changes in the number of colorant quanta per pixel in moving along fine gradations within the printer gamut.)

The second of the two conditions is a rather different matter, though also related to liquid control. We have discovered a curious dilemma in regard to maintenance of smooth calorimetric gradation: while supplemental uses of light colorants are beneficial for transitions, extensive usage of light colorant will result in early exhaustion of the light-colorant supplies. Our invention mitigates this dilemma by avoiding alternative usage of real black colorant vs. composite black (for example equal quantities of CMY)—so that in some areas of the gamut black colorant is used to the exclusion of composite black.

Although this second aspect of the invention in its broad form thus represents a significant advance in the art, it is preferably practiced in conjunction with certain other features or characteristics that further enhance enjoyment of overall benefits.

For example, we prefer that the second (usage modification) condition operate by fuzzy logic—as will be detailed below. We also prefer that after the selecting step, at least some of the entries initially associated with original colorant-set combinations be associated (or reassociated) instead with corresponding black-replacement combinations.

Furthermore we prefer that the forming step also be subject to another condition. That condition is modification of colorant-quantum color-coordinate values to account for inexactness of composite black equivalence to black colorant. The condition is preferably made to depend particularly on distance from a black corner.

Now in preferred embodiments of a third of its basic aspects, the invention procedure has some commonality with the second facet discussed above—namely, it includes the steps of establishing a multiplicity of colorant-set combinations as candidates for selection to serve as device states, forming black-replacement combinations from at least some of the colorant-set combinations, and selecting some of the black-replacement combinations and some other ones of the colorant-set combinations to serve as device states.

In this third facet, however, the colorant replacement step is subject to a new condition: replacement is permitted only if at least a specified quantity of composite black is available for replacement.

The foregoing may represent a description or definition of the third independent facet of the invention in its broadest or most general form. Even in this form, however, it will be appreciated that this aspect too resolves important limitations of the art heretofore.

In particular, this aspect of the invention, as implemented, strongly tends to establish and preserve a mixture of real black colorant with composite black, rather than allowing the system to gravitate rapidly to all-real-black renditions. We have found that this characteristic in turn is beneficial to smoothness of gradations.

Its most significant effect is in controlling just where along the light-toward-dark-color continuum the first real-black colorant quantum is used. We have noted that this particular characteristic is best made media dependent, since some printing media can manage elevated levels of black ink better than others. This third facet of the invention thus facilitates establishment of a printing-medium dependence of the onset of real black colorant along that continuum.

Although the third independent aspect of the invention, even in this broadest form, accordingly makes important advancements in the art of multicolorant, multiquantum inkjet printing, nevertheless we prefer to practice this aspect too in conjunction with certain other characteristics or features that enhance enjoyment of its benefits. For example we prefer that the "specified quantity" of composite black be made equivalent to two quanta of black colorant. This condition dictates that no black replacement can occur upon the first appearance of composite black (e. g., one quantum each of CMY) in a light-to-dark-color transition or continuum.

We also prefer that the forming step replace less than the entire specified quantity of composite colorant. Once again, at the first replacement of composite black if the required amount of composite black corresponds to two quanta each of CMY, only one of those two quanta is subject to replacement. In other words, what remains after replacement is one quanta each of CMY and one quanta of real black colorant.

In preferred embodiments of a fourth of its aspects, the invention includes the step of establishing a multiplicity of colorant-set combinations as candidates for selection to serve as device states. In one variant of this fourth facet of the invention, the multiplicity of candidate drop-set combinations includes all possible color combinations in a set of substantially different colors. In another variant of this fourth aspect of the invention, another step is eliminating colorant-set combinations which violate either or both of two certain conditions; and still another step is selecting remaining colorant-set combinations to serve as device states.

The two required conditions are:

(a) presence of a companion light colorant quantum with each dark colorant quantum, and (b) small changes in number of quanta per pixel, in each colorant transition within the printer gamut.

The foregoing may represent a description or definition of the fourth independent aspect or facet of the invention in its most general or broad form.

Even in this form, however, it can be seen that the fourth facet of the invention importantly resolves troublesome difficulties of the art. In particular, both these conditions go to the problem of achieving smooth gradations—a problem that is familiar.

They attack this problem, however, through an avenue not heretofore recognized as closely related to smoothness of calorimetric gradations, namely the number of quanta of liquid deposited in each pixel. We have recognized that a companion light colorant quantum with each dark quantum acts to help diffuse the dark ink slightly, and helps to fill out the pixel area—and we prefer to apply this first condition particularly in lighter regions where dark quanta are usually isolated.

The second condition has a much more important and pervasive, but even more obscure, impact on image quality. We have noted that heavier colorant loads, once deposited, end to flow into adjacent lightly loaded pixels or pixel groups.

Although the resulting uncontrolled color crosstalk in many individual cases may coincidentally tend to improve gradation, on balance over the long term the result is harmful. We therefore consider it very beneficial to select, for our device states, colorant-set combinations that provide ink transitions characterized by small changes in number of quanta—or, to state the same thing in another way, combinations that avoid abrupt transitions.

As to this aspect of the invention we are discussing transitions between colors that are adjacent within the palette, i. e. adjacent in color space—not merely adjacent within an image in physical space. We are trying to control liquid-loading profiles associated with adjacency within the gamut, so that when palette-adjacent colors are called upon to reproduce a smooth color transition for image-adjacent pixels, they will do so faithfully. When color transitions in image detail are abrupt, on the other hand (as for instance along the sharp edge of an object colored very differently from its background, or along the boundaries of stripes in a flag) naturally it is desirable to follow such crisp changes as faithfully as possible.

Although the fourth facet of the invention as couched in its most general form thus importantly advances the field of multicolorant, multiquantum printing, nevertheless we prefer to practice this aspect of the invention in conjunction with other characteristics or features that further enhance its benefits. For example, we prefer to implement the phrase "small change" in condition (b) as meaning a change by no more than two quanta or, equivalently and more generally, half the number of nonzero quanta-number possibilities for each colorant.

We also prefer that the eliminating step also eliminate combinations which violate either or both of these conditions:

(c) a limit on the maximum number of quanta of all colors, per pixel; and (d) a limit on the maximum numbers of quanta of each ink color respectively, per pixel.

Further preferably, eliminations based on condition (a) above are subject to the constraint that a quantum combination required by condition (a) must also satisfy both conditions (c) and (d).

As to preferred embodiments of a fifth of its aspects, the procedure includes the step of defining a multiplicity of major entries, and also the step of establishing a multiplicity of device states for use in printing. The multiplicity of device states is smaller in number than the multiplicity of major entries.

Another step is then assigning one device state to each major entry. In one variant of this fifth facet of the invention, the multiplicity of major entries includes all possible color combinations in a set of substantially different colors. In another variant of this fifth aspect of the invention, the above-mentioned assignment is based in part upon either or both of these criteria:

near the gamut surface, favoring device states that are relatively close to the surface in preference to device states that are relatively close to the desired major entry, unless the surface is near the dark end of the gamut, and near the neutral axis and particularly at the dark end of that axis, favoring colors that contain real black ink.

By "close" and "near" of course we refer to metrics in color space, not physical space or intraimage location. The foregoing may represent a description or definition of the fifth independent aspect or facet of the invention in its most general or broad form.

Even in this form, however, it can be seen that the fifth facet of the invention importantly resolves troublesome difficulties of the art. In particular, if the first criterion is not observed, error in the direction normal (in color space) to the gamut surface accumulates and eventually is clipped by the halftone table. The error between selected CMY and desired CMY then fails to be compensated in the error-diffusion process—resulting in a large hole in the palette.

Although the fifth facet of the invention as couched in its most general form thus importantly advances the art, we nonetheless prefer to practice this aspect of the invention in conjunction with other features or characteristics that optimize the enjoyment of its benefits. For example, we prefer that the assigning step be also based in part upon another criterion: closeness of states to each major entry.

In addition we prefer to implement the term "favoring" by using weighting factors that respectively increase the influence of metrics sensitive to distance in color space from the surface and to real-black-colorant content, or decrease the influence of metrics sensitive to distance from a major entry. We also prefer to implement the term "near" by applying a threshold to the use of the weighting factors. We further prefer to employ specific numerical values stated elsewhere in this document for weighting factors, ratios or other relationships between factors, and thresholds.

In preferred embodiments of a sixth aspect or facet of the invention, the procedure—as for the fifth aspect discussed just above—includes the steps of defining a multiplicity of major entries, and establishing a multiplicity of device states for use in printing (the multiplicity of device states being smaller in number than the multiplicity of major entries), and then assigning one device state to each major entry.

Additional steps for this sixth facet of the invention include forming a set of preferably one-dimensional lookup tables. These tables are for locating major entries based upon an input-color specification.

The foregoing may represent a description or definition of the sixth independent aspect or facet of the invention in its most general or broad form. Even in this form, however, it can be seen that the sixth facet of the invention importantly resolves troublesome difficulties of the art. One-dimensional lookup tables are very small, and looking up color coordinates in them is a very rapid process, even if the indices used in these tables include every possible color-coordinate value—for instance, from zero through 255.

More interestingly the use of single-dimensional tables, to gain entry to the three-dimensional tables that relate major entries to device states, provides system designers additional degrees of freedom in controlling the relationship between input color specifications and halftoning output. These newly introduced degrees of freedom, as will be seen, offer a surprising amount of flexibility that can be exploited in several ways to enhance smoothness of gradations, quick throughput in error diffusion, and routine accommodation of multiple printing media.

Although the sixth aspect of the invention as thus broadly couched thus advances the art significantly, nevertheless, we prefer to practice this aspect of the invention together with other features or characteristics that maximize its benefits. For example, we prefer that the one-dimensional lookup tables not be monotonic in their assignment of major entries to indices—with resulting benefits described earlier in our discussion of preferences for the first independent facet of the invention.

Another preference is that the forming and storing steps include associating precomputed error-diffusion error distributions with indices in the lookup tables. Our invention proves to be particularly excellent in dealing with the special problems of constructing tables for use with several different media.

In this context the associating step perhaps naturally includes divergent overall tabulation of device states as such, in particular with greatly varying limits on numbers of colorant quanta and other greatly varying palette decisions peculiar to different media. A more sophisticated feature is that the associating step also includes associating different precomputed error-diffusion error distributions with the indices, in lookup tables for different media respectively.

In preferred embodiments of a seventh aspect or facet of the invention, the procedure includes the steps of establishing a multiplicity of device states for use in printing, and then formulating a device-state lookup table. That lookup table includes (a) the device states in conjunction with (b) means for accessing the device states based upon input color specifications.

Additional steps include then using the device-state lookup table to print a multiplicity of halftone colors that are nominally neutral according to the device-state table. The procedure also includes then photometrically measuring the printed halftone colors to obtain measured colorimetric values.

A further step is then applying the measured colorimetric values to adjust the accessing means, to achieve an adjusted device-state lookup table having an improved neutral ramp. Thus this facet of the invention has the general character of an iteration or fine tuning of the basic procedure—as discussed earlier in connection with preferences for the first aspect of the invention.

The foregoing may represent a description or definition of the seventh independent aspect or facet of the invention in its most general or broad form. Even in this form, however, it can be seen that the seventh facet of the invention importantly resolves troublesome difficulties of the art. In particular, based upon this facet of our invention a printer is able to produce a respectably accurate neutral ramp even when the operator chooses to turn off the color tables (or other color-correction module)—and to attain a truly excellent level of accuracy for neutral colors when color correction is turned on.

Although this method even as thus broadly couched serves an excellent purpose, nevertheless preferably it is performed with certain additional features or characteristics. For instance we prefer that the using step include printing preferably at least thirty-two nominally neutral colors—and that the applying step include effectuating a generally consistent proportional adjustment, or at least a smoothly varying adjustment, for substantially all the device states.

In preferred embodiments of an eighth facet of the invention, our procedure includes the step of printing and photometrically measuring three ramps for respectively different pure secondary colors available in the printer. It also includes using substantially exclusively the ramp photometric measurements to establish at least an initial version of a transform from three-dimensional color coordinates to the six-or-more-colorant system in the printer.

This facet of the invention can be recognized as complementary to the first, discussed above, in that this eighth facet collects information about inking for use in establishing an entire palette based upon only a set of nominally orthogonal ramps. Here the ramps do not correspond to single physical colorants as in the first aspect of the invention but rather correspond instead to essentially fundamental combinations of those colorants as described earlier.

Advantages and preferences associated with this facet or aspect of the invention are closely comparable to those stated earlier for the first aspect. Thus, while this facet of the invention concentrates on constructing ramps of secondaries, it will be understood that—analogously to the first aspect of the invention—it is within the scope of the invention to supplement these data with a relatively small amount of additional information. Such information can be found by printing and measuring primary colors, and black, to complete at least an initial version of the transform.

Also, as in the case of the first aspect of the invention, we prefer to perform a partial iteration to refine the transform with respect to its performance near the neutral axis of the gamut. This process consists of using a completed initial version of the transform to print a series of substantially neutral colors, photometrically measuring that series, and using the measurements.

All of the foregoing operational principles and advantages of the present invention will be more fully appreciated upon consideration of the following detailed description, with reference to the appended drawings, of which:

BRIEF DESCRIPTION OF THE DRAWINGS

FIG. 4 is a corresponding table of numbers of $C_D$ and $C_L$ inkdrops, color number, measured L* value, and C value for the light and dark cyan inks;

DETAILED DESCRIPTION OF THE PREFERRED EMBODIMENTS

Figure 1:
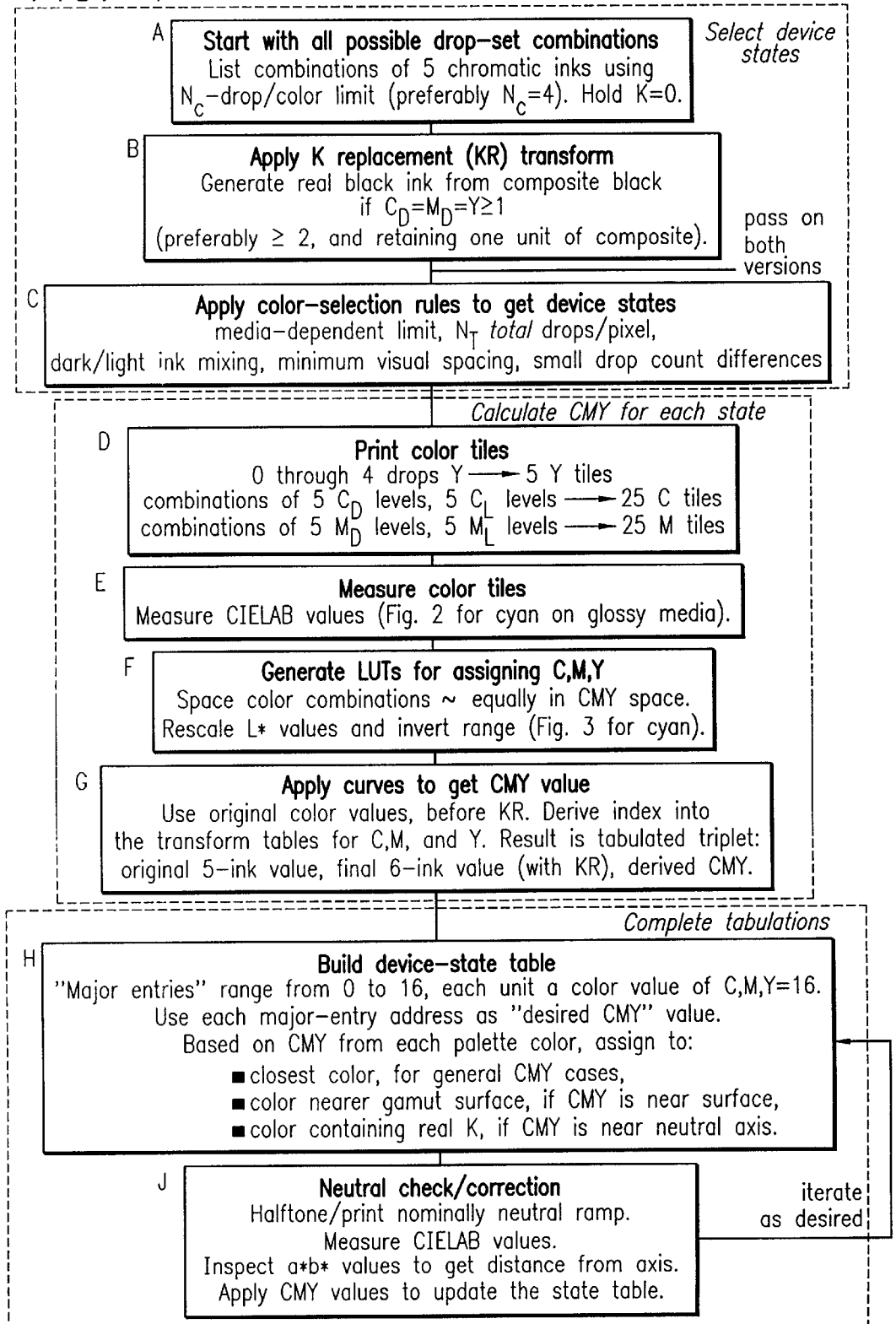
FIG. 1 is a flow chart showing generally the overall procedures of a preferred embodiment of our invention.

The process of constructing device-state tables consists of several main steps:

(1) Decide which colors will be in the color palette.

(By placing restrictions on which colors are in the palette, we can impose certain properties on the halftoning process. For example, we can enforce a maximum number of drops per pixel by limiting color in the palette to that number of drops or less.)

(2) Build an association between colors in the palette and the CMY space in which halftoning is done.

(We associate colors made by combinations of six inks to a numerical CMY space ranging from 0 to 255 for each of C, M, and Y. In the general case, we are associating colors made by N inks, to CMY or RGB, or some other 3D coordinate system. After this step, the palette of colors consists of a table of pairs: a six-ink space color, and a CMY value for each color.)

(3) Use the colors in the palette to construct the device-state lookup table.

The procedure begins with enumeration A (FIG. 1) of all possible drop-set combinations. We list possible combinations of the five color inks, using a limit of $N_C$ drops per color at each pixel. Black is held at zero for now, to be generated later through a process of replacing composite black with real black ink. The values generated in this step are sent to the next step for modification and possible elimination. For definiteness we illustrate in Table 1 a few exemplary generated values.

TABLE 1

Representative enumeration of drop sets

| $C_D$ | $C_L$ | $M_D$ | $M_L$ | Y | K |
|---|---|---|---|---|---|
| 0 | 0 | 0 | 0 | 0 | 0 |
| 0 | 0 | 0 | 0 | 1 | 0 |
| 0 | 0 | 0 | 0 | 2 | 0 |
| ... | ... | ... | ... | ... | 0 |
| N | N | N | N | N | 0 |

Next we apply B the black-replacement (KR) transform. In this step, real black ink usage is generated algorithmically when composite black is present. A unit of composite black is one drop each of $C_D$, $M_D$, and Y; thus our algorithm can be made to recognize composite black when the numbers of drops of $C_D$, $M_D$ and Y are each equal to one or more.

In the preferred method, however, only a color that has two or more units of composite black will be considered for black replacement; thus we can use the condition that the number of drops of $CD_D$, $M_D$ and Y are all greater than one, and if desired also the condition that they be equal to each other. In the new color, one unit of composite black remains, and the remaining units of composite black are replaced with an equal number of units of real black.

Thus if the original color has $C_D>2$ and $M_D>2$ and $Y>2$, then our algorithm forms a new color with the number of black drops $K=\min(C_D,M_D,Y)-1$, and with $C_D=C_D-K$, $M_D=M_D-K$ and $Y=Y-K$. Examples appear in Table 2.

TABLE 2

Exemplary colors after selective replacement

| original color | | | | | | final color (black replacement) | | | | | |
|---|---|---|---|---|---|---|---|---|---|---|---|
| $C_D$ | $C_L$ | $M_D$ | $M_L$ | Y | K | $C_D$ | $C_L$ | $M_D$ | $M_L$ | Y | K |
| 1 | 0 | 1 | 0 | 1 | 0 | 1 | 0 | 1 | 0 | 1 | 0 |
| 2 | 0 | 2 | 0 | 2 | 0 | 1 | 0 | 1 | 0 | 1 | 1 |
| 4 | 0 | 2 | 0 | 2 | 0 | 3 | 0 | 1 | 0 | 1 | 1 |
| 3 | 0 | 3 | 0 | 3 | 0 | 1 | 0 | 1 | 0 | 1 | 2 |
| 4 | 1 | 4 | 1 | 4 | 0 | 1 | 1 | 1 | 1 | 1 | 3 |

Figure 6:
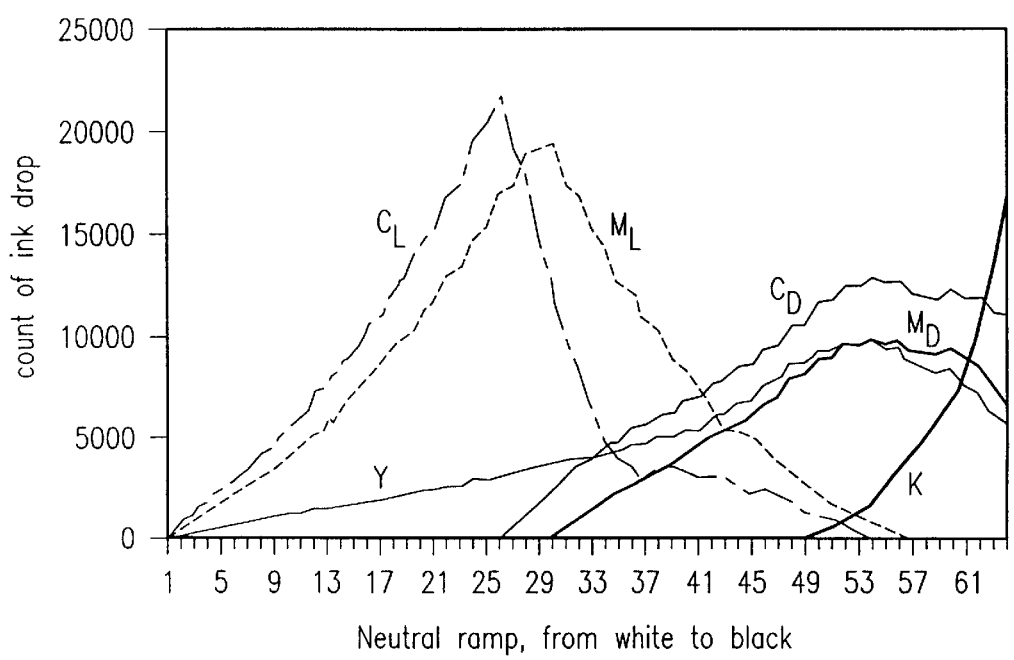
FIG. 6 is a graph showing inkdrop counts used in rendering a halftoned neutral ramp, used in a preferred embodiment of our invention.

The eventual results of this process—together with other steps to be detailed below—in the finished tables include a very systematically controllable distribution of inking as among the six inks. We are able to obtain inking that goes beyond even the constraints of color, drying time, throughput and the like, to effectuate even a balancing of ink usage as between ink chambers. In this regard, since we use two three-chamber pens, what is most important is to very roughly equalize at least the usage as between chambers within each pen (illustrated in FIG. 6 for the gray ramp).

The final black-replaced color and also the original version of the same color are both retained and passed on (at the point so denoted in FIG. 1) to the color-selection process C. Colors failing the conditions applied here are eliminated from the set. There are four important rules:

(1) Drop limiting Final colors must adhere to a strict limit of $N_T$ drops total at each pixel. This condition should be compared with the condition in step A of $N_C$ drops per color at each pixel.

$N_T$ depends on the particular printing medium for which the device-state table is being prepared. Papers that can accept larger numbers of drops have a larger $N_T$.

(2) Dark/light ink mixing—Our algorithm requires that colors with low numbers of drops of dark ink also have at least some light ink present.

(3) Minimum visual spacing—Colors that are visually too close together are eliminated. More specifically, if two colors cannot be visually distinguished, our invention eliminates one from the palette.

(4) Small drop-count differences—For colors visually near each other in the color space, avoid adjacent colors with large drop-count differences. An example of this will be understood by considering the progression of colors from white to full cyan. The beginning of the progression of drop sets with their total drop counts is:

| breakdown | | total |
|---|---|---|
| $C_D$ | $C_L$ | drops |
| 0 | 0 | 0 |
| 0 | 1 | 1 |
| 0 | 2 | 2 |
| 0 | 3 | 3 |
| 0 | 4 | 4 ⎫ |
| 1 | 0 | 1 ⎬ suboptimal |
| 1 | 1 | 2 ⎭ |
| 1 | 2 | 3 |
| | ... | |

As shown, the progression of drop counts for these colors is 0, 1, 2, 3, 4, 1, 2, 3 . . . . The three-drop transition from four drops of light cyan $4C_L$ down to one drop of dark cyan $1C_D$ (i. e., from a four-drop to a one-drop color) is less than optimal. We prefer that the drop-count difference between colors that are visually adjacent (in color space as distinguished from physical space) be no more than two.

At this point palette selection (the upper dashed block titled "Select device states" in FIG. 1) is complete and our algorithm moves on to calculation of CMY values for each state. The first step is printing D of color tiles.

Drop-set ramps are printed representing the respective ranges of cyan, magenta and yellow. Yellow color tiles representing zero through four drops are printed. For magenta and cyan, combinations of each are printed (e. g. five levels of $C_D$ and five levels of $C_L$ for a total number of combinations 5√5=25).

Figure 2:
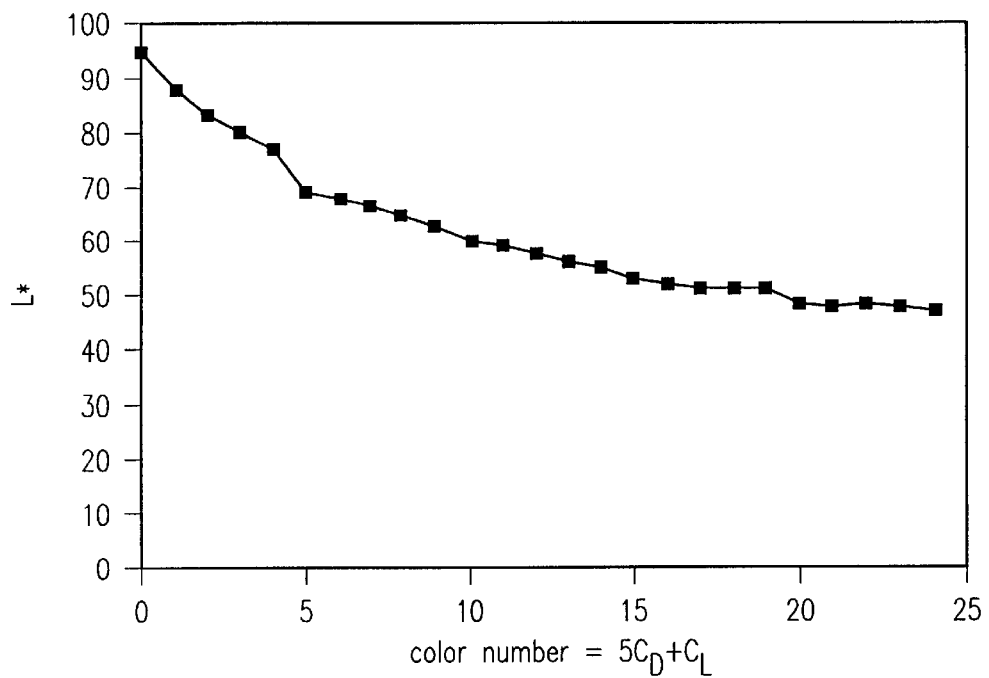
FIG. 2 is a graph showing lightness L* of cyan drop-sets for a one-dimensional ramp measured according to the FIG. 1 procedures.

Next we measure E the CIELAB value of each of the tiles (five for yellow, twenty-five each for cyan and magenta). FIG. 2 represents the lightness values of the twenty-five combinations of cyan on glossy media. Plotted on the graph is L* for each color number $5C_D+C_L$. Thus the color number range is from zero through twenty-four.

The lightness values are then used F in generating lookup tables used in assigning C, M, and Y values to the previously selected device states. The object is to space the color combinations somewhat equally according to perceptual lightness of the colors. Using $C_D$, $C_L$ as an example, we would like to map these two values to a range of 0 to 255 (or slightly larger).

Representatively the lightest color, color number zero ($C_D$=0, $C_L$=0—also written $OC_D$ $OC_L$), has an approximate lightness value L*≅94. The darkest, color number twenty-four ($4C_D$ $4C_L$), has lightness L*≅48. Color number twenty ($4C_D$ $0C_L$) has a lightness value of L*≅49. On our cyan scale of 0 through 255, we choose color zero to be represented by C=0, and color twenty ($4C_D$ $0C_L$) to be represented by C≅255.

Figure 3:
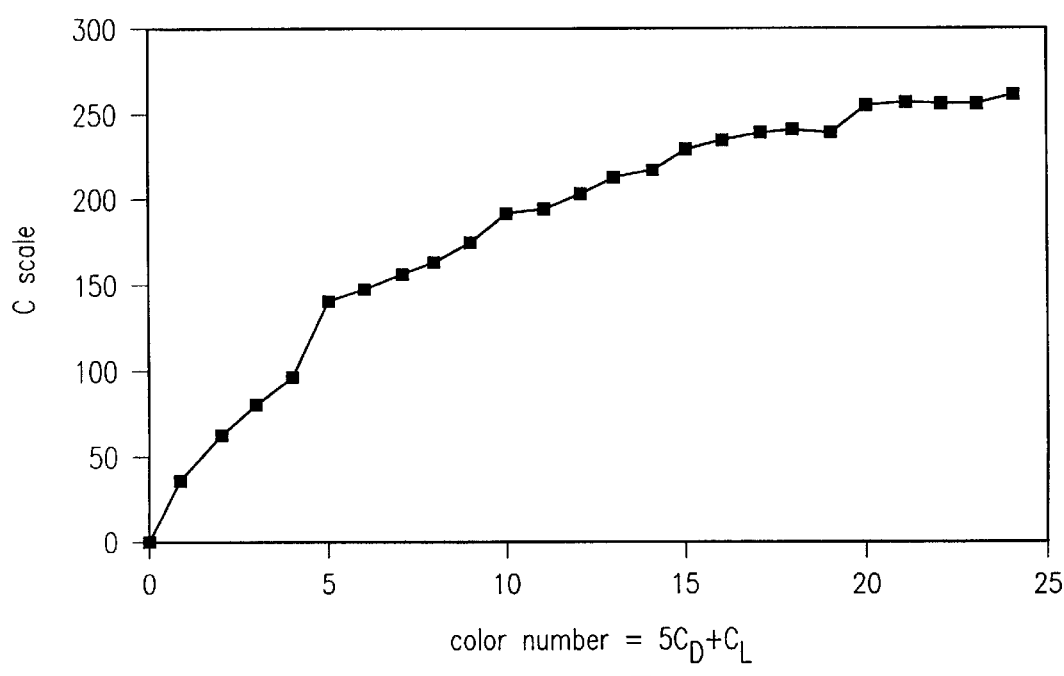
FIG. 3 is a corresponding graph showing C (cyan) value for the FIG. 2 data after inversion and resealing.

To derive a lookup table to provide this transformation, we rescale the L* values and invert the range. Graphing this lookup table yields FIG. 3, and the resulting overall equivalence between number of inkdrops, color number, lightness and C value summarized in FIG. 4. Similar relations for the $M_D$,$M_L$-inkspace-to-magenta transform and the Y-inkspace-to-yellow-transform are established.

Figure 5:
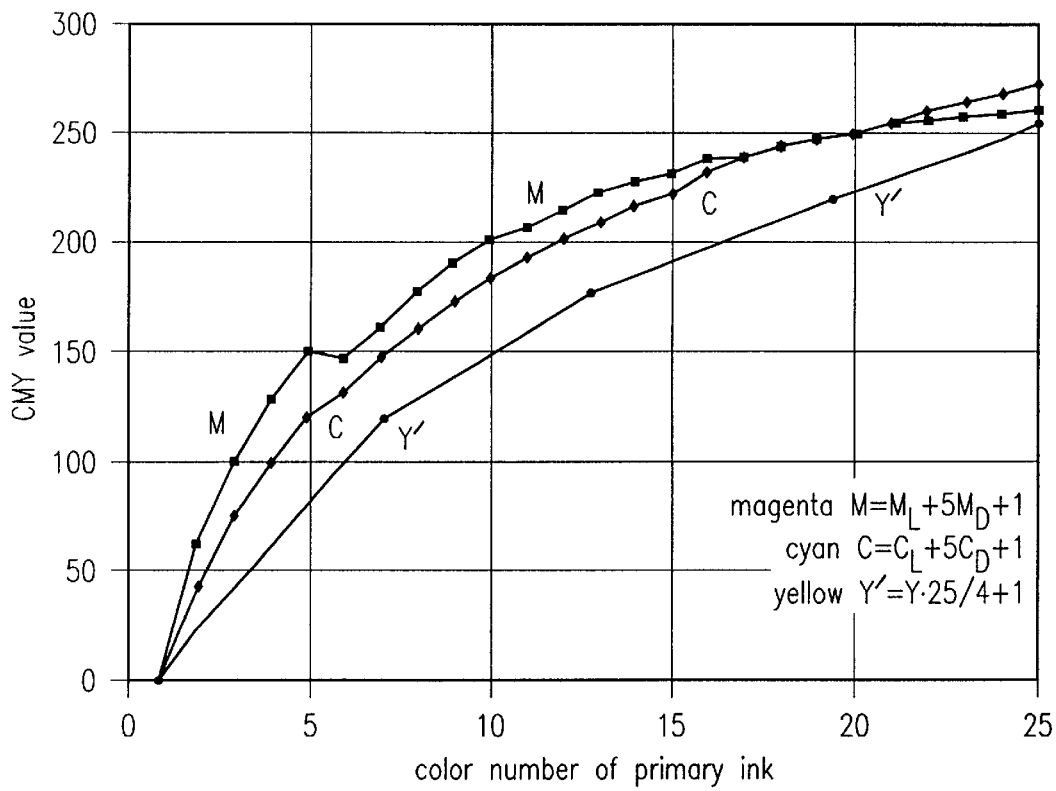
FIG. 5 is a graph like FIG. 3 but showing a slightly different set of cyan values, together with values for magenta and yellow (the yellow scale Y' being modified for readier showing of values for all three colors together)

As noted earlier, in this current implementation D (FIG. 1) yellow has only one ink, and is typically used by allowing the number of drops per pixel to range from zero through four. This yields a table with five entries, with zero drop corresponding to Y=0, and four drops corresponding to Y=255. We can display all the results together if we rescale the yellow ramp to a color number Y'≅Y·25/4. (FIG. 5 shows a variant display in which the scales are all shifted upward by one unit, to run from one through twenty-five.)

Another part of our procedure applies G the derived curves using the "original" colors (Table 2) to get CMY values. As will be recalled, the original color values are those before K replacement.

Figure 7:
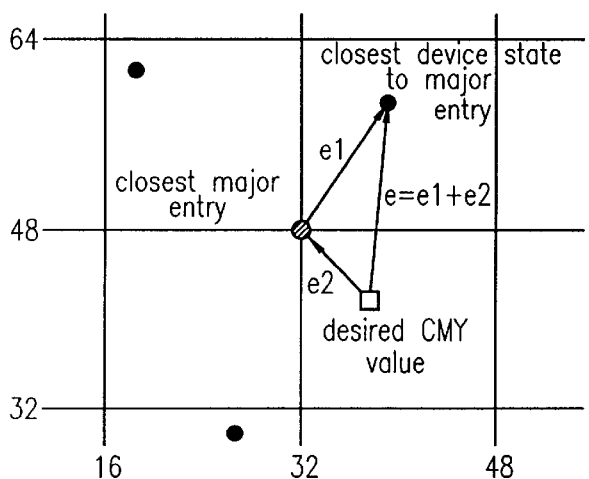
FIG. 7 is a diagram showing in a simplified two dimensional color-space model how preferred embodiments of the invention select a device state in response to an input desired value, and preferably also provide information used to quickly determine error to be diffused at run time.

These are used to derive respective indices into the transform tables for cyan, magenta and yellow. This first stage of our lookup facility is used at run time to lead from a desired CMY value (abstracted for just two color-space dimensions in FIG. 7) to the closest major entry.

As an example, consider a drop-set combination $2C_D$ $1C_L$ $4M_D$ $0M_L$ 1Y 0K. Its index into the cyan lookup table is 2·5+1=11, that into the magenta table is 4·5+0=20, and the index into yellow is 1. Using these three indices and their corresponding one-dimensional lookup tables, we look up the CMY value. We now have a triplet: the original five-color (no black) ink value, the final six-color ink value (with black replacement), and the derived CMY value.

At this point, as mentioned earlier, we prefer to use index-to-major-entry assignments that are not perfectly monotonic. In particular it is desirable near the transition between two major entries, in many parts of the tabulations, to alternate between the two entries in proceeding along the corresponding list of indices.

This tactic has been found to yield final printed results, made by error-diffusion halftoning using our finished tables, in which contouring is actually diminished and effective gradations smoother—as compared with monotonically formed index sequences. This practice of mixing up the order is believed to introduce a sort of pseudorandomness that helps blend the colors better.

It is preferable for rapid run-time performance, though by no means a fundamental operating requirement in use of our invention, to include in this first-stage tabulation at least the total indexing errors for each of the three system axes. This indexing error e2 (in vector form in FIG. 7) may be regarded as supplemental to the error e1 in the main device-state lookup function that follows, in the sense that variants of our invention can operate by direct search or lookup in the device table—though as mentioned earlier at considerable cost of time or storage capacity. The supplemental error e2, if tabulated, can be broken down by actual run-time calculation into four or more fractions or fragments e21, e22, e23, e24 (not shown) for each color axis, for distribution to nearby pixels.

Figure 11:
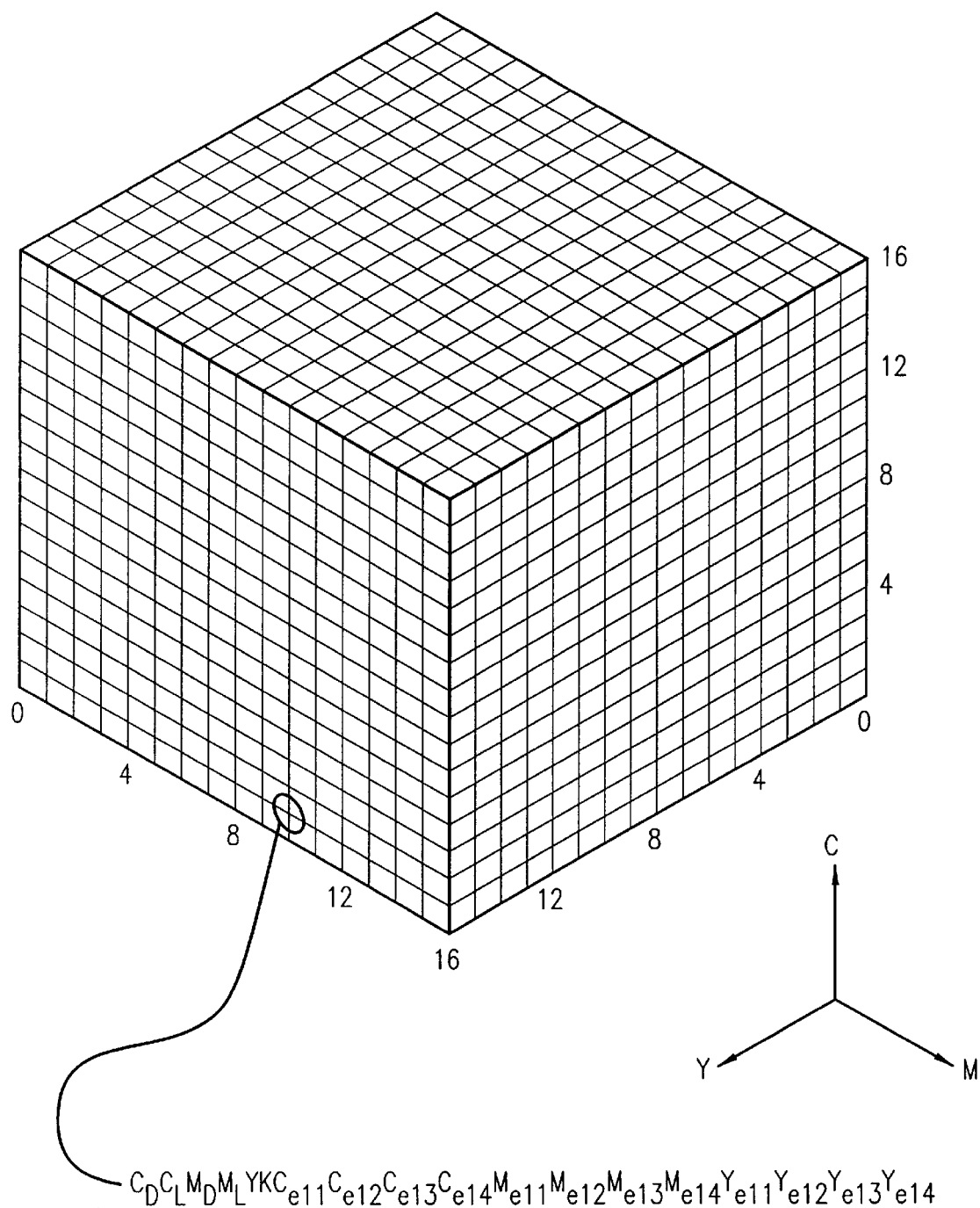
FIG. 11 is a highly schematic perspective sketch showing a finished three-dimensional lookup table in accordance with certain preferred embodiments of the invention.

For even faster performance, however, the tabulation can explicitly include all those fragments of e21 . . . e24—i. e., $C_{e21}$ (FIG. 11), $C_{e22}$, $C_{e23}$, $C_{e24}$ for cyan, and likewise $M_{e21}$, $M_{e22}$, $M_{e23}$, $M_{e24}$ for magenta and $Y_{e21}$, $Y_{e22}$, $Y_{e23}$, $Y_{e24}$ for yellow. At run time, these numbers can be fetched from the table much more quickly than they can be calculated by subtraction and multiplication. Whether looked up or computed, in any event the fragments are effectively to be added to their corresponding fractions of the principal error e1 (FIG. 7)—to yield the total error e=e1+e2.

The tabulations can then be completed as indicated within the third dashed block in FIG. 1. Our algorithm builds H a device-state table which—during run time—will help to answer the question: "What is the closest (or closest preferred) color in the palette to a particular input CMY pixel value?"

Another way of expressing this question is to omit the parenthetical qualification and say instead that the search criterion "closest" varies with position in the color gamut. The two semantic formulations are equivalent in terms of results, as will be explained shortly.

Each major entry in the table will contain the "closest" palette color for a range of input CMY values. This scheme eliminates a search for every pixel processed.

As an example, consider a device-state table with a size of 17×17×17 (FIG. 11) for CMY. In each axis, indices range from zero through sixteen. Index zero corresponds to an input value of zero, i. e. C=0, M=0 or Y=0. Index one means a value of sixteen (e. g. C=16), index three, a value of thirty-two—and so forth to index fifteen, a value of 240, and index sixteen, a value of 255. The address of each major entry (an integral index of zero through sixteen for each of C, M and Y) is used as the "desired CMY" value. The algorithm then searches for the "closest" color based on CMY for each palette color.

As mentioned above, the search criterion "closest color" is changed depending on where in the color space the "desired CMY" value is located. In the general case, a generally customary sum-of-the-squares metric is used to determine distance in color space—but modified by applying a factor f to the cyan and magenta terms, thus:

$$\text{color difference} = 2[(C_{ME}-C_{DS})^2 + (C_{ME}-C_{DS})^2] + (Y_{ME}-Y_{DS})^2$$

where $1 \leq f \leq 10$ depending on the CMY value of the major entry, and preferably f=1.75; and the subscripts "ME" and "DS" identify major-entry and device-state values respectively.

If, however, the "desired color" is near the CMY neutral axis or the dark end of the color gamut, or both, the search is weighted to favor colors containing real black. To accomplish this we first calculate a weighting factor $\epsilon$ which is large near the neutral axis or close to the dark end of the gamut, or both:

$$\varepsilon = \left( \frac{\lambda \min(C_{ME}, M_{ME}, Y_{ME}) + \text{mid}(C_{ME}, M_{ME}, Y_{ME})}{255(\lambda+1)} \right)^{1.8}$$

in which $\lambda$ is greater than 1, and the function m( ) is the operation to get the middle value of the three numbers C, M and Y. We prefer to make $\lambda$ approximately three, though it can range from roughly 0.1 through ten. Its value is chosen based on the preferred three-dimensional shape of the dark-end region.

Then each color-space positional difference is calculated as in the general case, but multiplied by a factor:

If $\epsilon > 0.5$ and the device state has no real black, the difference is multiplied by $(1+2\epsilon)$.

If $\epsilon < 0.5$ and the device state has real black, the difference is multiplied by $(1+1/\epsilon)$.

The distance thus weighted is then compared with other distances straightforwardly, and the candidate device state with smallest difference is selected as the "closest" color, to serve as the desired major entry. Techniques of these general sorts are described in, e. g., the previously identified work of Terano et al. dealing with modern concepts known as "fuzzy logic".

Figure 8:
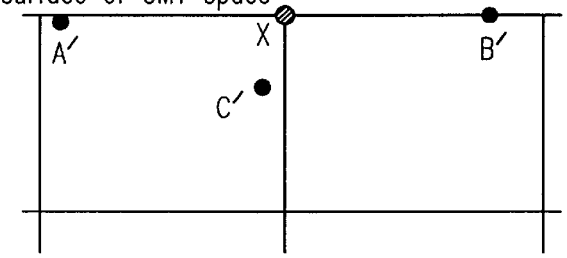
FIG. 8 is a like diagram, but somewhat enlarged, showing how near-gamut-surface device states are favored during assignments to major entries at the surface, in preferred embodiments of the invention.

If, however, a desired color X (FIG. 8) is near the surface of the color space, the search instead favors colors A', B' that are near the surface, even though there may be a closer color C' within the color space. Otherwise, i. e. in the general case, the algorithm uses the differences between the desired color and the CMY of the palette colors—but weighting intragamut distances along the C and M axes more heavily than those for Y, to account for the smaller visual sensitivity to changes in yellow.

As a practical matter, the "favoring" for near-gamut-boundary colors is accomplished as follows. Given that the coordinates of a desired major entry are $C_{ME}, M_{ME}, Y_{ME}$, and a candidate device state has value $CD_{DS}, M_{DS}, Y_{DS}$, our algorithm does not consider the candidate in any of these six circumstances:

$C_{ME}=0$ and $C_{DS}>5$
$C_{ME}=255$ and $C_{DS}<248$
$M_{ME}=0$ and $M_{DS}>5$
$M_{ME}=255$ and $M_{DS}<248$
$Y_{ME}=0$ and $Y_{DS}>5$
$Y_{ME}=255$ and $Y_{DS}<248$.

As result, some device states (say 245,122,102) are not considered even if they are closer to a major entry on the surface (say 255,128,96) than another device state (say 252,100,88) that is selected. It will be noted, however, that these thresholds operate to flatly disqualify a device-state candidate and so may be regarded as so-called "hard" rules, whereas weighting methodologies may be seen as creating soft (or "fuzzy") rules.

In most areas along the gamut surface, ample device states are present—minimizing the likelihood of a conspicuously remote surface color being selected in place of a nearby interior color. This is true for the top surface, extending out to the saturation regions, and also for the bottom-most region near the black node.

Some relatively isolated regions in the underside of the gamut surface, but spaced away from the black point, have few available surface colors. For the most part, our near-gamut-surface rules result in shifting surface points in this region to black, or in some cases to a quite dark chromatic color—very occasionally produce significant chromatic shift in individual pixels. Of course these are not ordinarily noticeable in final halftoned results, since the resulting propagated error tends to invoke an oppositely directed error and shift very nearby.

It is preferable for rapid run-time performance, though by no means a fundamental operating requirement in use of our invention, to include in this second-stage tabulation at least the total errors $C_e$, $M_e$, $Y_e$ (see Appendix) for each of the three system axes. This principal error e1 (in vector form in FIG. 7) can then be broken down by actual run-time calculation into four or more fractions or fragments e11, e12, e13, e14 (not shown in FIG. 7) for each color axis, for distribution to nearby pixels.

For even faster performance, but at the cost of considerable data storage capacity, the tabulation can explicitly include all those fragments—i. e., $C_{e11}, C_{e12}, C_{e13}, C_{e14}$ for cyan (FIG. 11), and likewise $M_{e11}, M_{e12}, M_{e13}, M_{e14}$ for magenta and $Y_{e11}, Yu_{e12}, Y_{e13}, Y_{e14}$ for yellow. At run time, these numbers can be fetched from the table much more quickly than they can be calculated by subtraction and multiplication. Whether looked up or computed, in any event the fragments are to be added to their corresponding fractions of the supplemental error e2 (FIG. 7), to yield the total error e=e1+e2. These numbers, in the embodiment of the invention under discussion, are tabulated for each point in the three-dimensional table—as indicated at a representative point 1,10,16 in FIG. 11. (This point corresponds to $C_{ME}, M_{ME}, Y_{ME}=16,160,255$.)

Our preferred final step is an iteration—usually just one such pass J suffices—to refine halftone accuracy along the neutral axis. This is important because the eye is particularly sensitive to presence of even very small amounts of net chromatic color in image regions that the viewer knows should be white or gray.

Moreover, doubtless as a result of that sensitivity, in industries such as commercial printing, photography, paint manufacturing, and textile dyeing a classical gauge of finest quality has long been careful inspection of white, gray, and even near-black specimens for spurious chromaticity. In our field, critical review often includes evaluation of the underlying neutral ramp alone, isolated from the benefit of color correction that actually may be available at run time, in series with the halftoning process.

In anticipation of such critical standards we half-tone and print a test sample of thirty-two patches of gray varying from white to black, using the table developed as described above. This printing is done in conjunction with the device-state error-diffusion algorithm described in our previously mentioned companion patent document "Device State Error Diffusion Technique for Halftoning".

Figure 9:
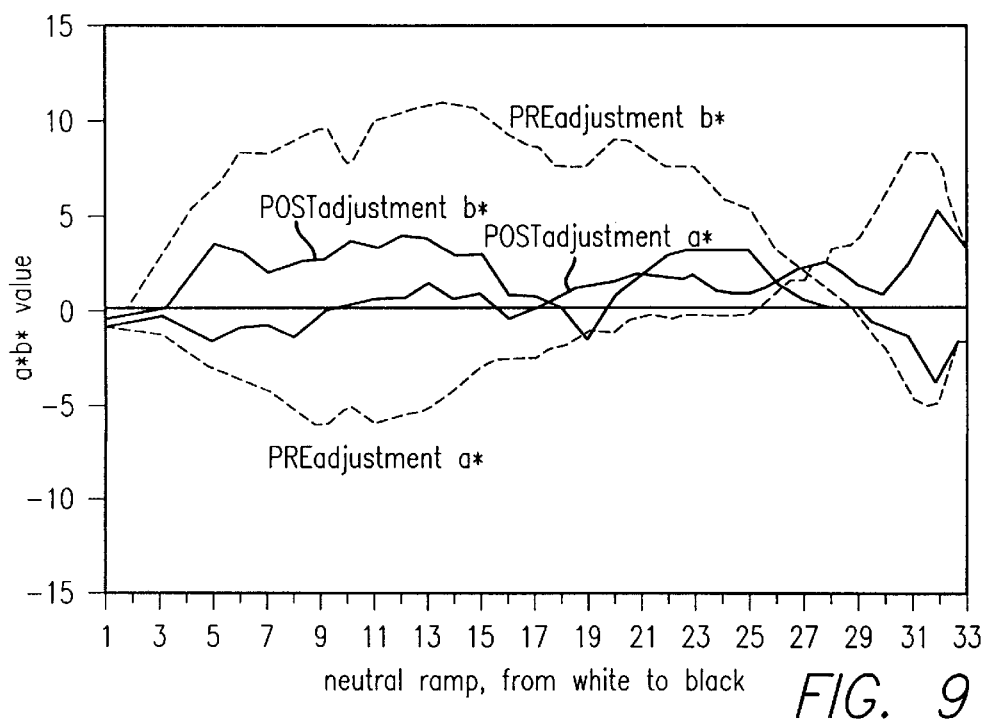
FIG. 9 is a graph illustrating refinement of the neutral ramp by iteration of final steps in preferred embodiments of our invention.

Next we measure the CIELAB value of each nominally gray patch. By inspecting the pradjustment a*, b* values (FIG. 9) for each tile color, we know its actual distance from neutral. Using this information, we alter the CMY value to better reflect the actual color of the tile.

Figure 10:
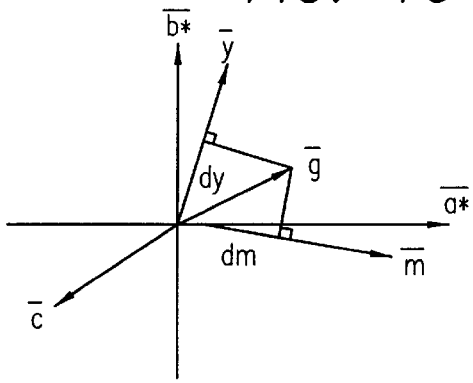
FIG. 10 is a diagram illustrating a color-space-geometry basis for certain of those steps.

More specifically, each set of measurements consists of three data: L*, a* and b*. We consider a vector $\bar{g}$(FIG. 10) which represents the projection vector of one of the measurements on the a*,b* plane. The magnitude and hue of this projection vector reveal the character of the departure from perfect or nominal chromatic neutrality.

The primary ramps of cyan, magenta and yellow inks are represented by the vectors $\bar{c}$, $\bar{m}$, $\bar{y}$. In general the vector $\bar{g}$ must fall between a particular two of these primary-ramp vectors. Our algorithm projects the vector $\bar{g}$ onto those particular two primary vectors—which, in the illustrated case, are the yellow and magenta vectors $\bar{y}$, $\bar{m}$. This procedure thus finds the yellow and magenta components $d\bar{y}$ and $d\bar{m}$ of the measured color. Under the stated assumptions, the projection of $\bar{g}$ onto the remaining third primary vector (in this case $\bar{c}$) is in general relatively small. We prefer to simply neglect that third component, not only because it is small considered alone but also because this entire module of our procedure is aimed at making a rather small fine correction.

We use the two larger components in conjunction with a color-space directional factor $\beta$, $$\beta = \left[\frac{\min(C_{ME}, M_{ME}, Y_{ME})}{\max(C_{ME}, M_{ME}, Y_{ME})}\right]^2$$

to find corrected values of the major entries—

$C_{DS}' = C_{DS} + \beta d\bar{c}$ $M_{DS}' = M_{DS} + \beta d\bar{m}$ $Y_{DS}' = Y_{DS} + \beta d\bar{y}$.

The corrected C'M'Y' values are used in just this way to update all major entries in the device-state table, forming a new table with postadjustment a*, b* much closer to the neutral (a*b*=0) axis. The relative impact of these corrections is inherently greatest near the neutral axis where already-existing chromatic components are small by definition, and progressively smaller for major entries further and further from the axis. This process thus in effect amounts, in relative terms, to a very generally proportional kind of adjustment throughout the palette—not merely moving of the particular points tested.

Although the neutral-correction loop HJ can be repeated multiple times until the color tiles converge on neutral to virtually any specified degree of accuracy, as a practical matter such extension of the procedure is usually superfluous. The reason is that residual error, as pointed out above, is removed incidentally in the course of commonly employed color-correction procedures upstream of the halftoning process.

ADDITIONAL BACKGROUND INFORMATION

The solution that was developed for the new six-ink technology makes three unique contributions. First, the algorithm to perform the error diffusion is new. Second, the method for computing which colors to use in the color palette is significant. Third, the halftone table generation process generates a mapping between three-dimensional CMY color space and six-dimensional ink space and makes the mapping efficient.

The term "device state" refers to the idea of states or colors that a printing device can print. For example, a binary four-color inkjet printer could perhaps produce sixteen spot colors without halftoning. A present six-ink printer—if not constrained as by the processes described in this document—can print approximately 2500 spot colors when those colors are produced such that each color has no more than four drops from any one ink, and no more than eight drops.

Device-state error diffusion, as implemented in our present printer, is based on a predefined palette of colors. Only those colors are used in the error-diffusion process. This implies that if all colors in the palette are eight-drop-or-less colors, then no pixel in the image can ever have more than eight drops of ink.

Early in the design of the product, before we had major advances in the ink and media, we felt that it would be very important to limit the ink we put down on a per-pixel basis. For our photographic-style printing media, we concluded that eight drops would be the maximum. Also, we felt that it was important to ensure a smoothness in the rate of change of number of drops used per pixel over the image. We tried to halftone in a way that when generating halftoned colors, we utilized colors with similar appearance and number of drops per pixel.

Logically, device-state error diffusion operates very simply. A set of colors in a palette is defined in which an equivalence is drawn between a three-dimensional space such as CMY and the six-ink color space. Each palette color is assigned a twenty-four-bit CMY value. Error diffusion proceeds as is typical. For each pixel in the image, a twenty-four-bit RGB value is obtained. It is complemented to form a twenty-four-bit device CMY value. Any propagated pixel error is added to form the term P+E (pixel plus error). The palette is searched to find the entry whose CMY value is closest to P+E. That palette color is printed (six-ink value). An error term is then computed which is the difference between the palette entry's CMY value and P+E. This error is divided into four terms and propagated to neighboring pixels. This basic processing proceeds for each pixel in the image.

Since a number of the steps above would not be practical to implement at run time, some approximations are made and shortcuts taken. Most importantly, the search operation mentioned above is replaced by a three-dimensional table lookup.

In actuality, the method is implemented in a series of steps as follows:

Complement the device RGB value to convert the pixel to device CMY.

Add incoming accumulated error to C, M, and Y to get C+E, M+E, and Y+E.

Use C+E to look up a value in the cyan one-dimensional lookup table (LUT). Get $C_i, C_{e1}, C_{e2}, C_{e3}, C_{e4}$. Do the same for M+E, and Y+E using the magenta and yellow one-dimensional LUTs. $C_i, M_i, Y_i$ forms a three-dimensional index into the three-dimensional lookup table. The error terms, $C_{e\ldots}, M_{e\ldots}, Y_{e\ldots}$ represent the error between the input pixel+error value and the address of the three-dimensional LUT formed by $C_i, M_i, Y_i$.

$C_i, M_i,$ and $Y_i$ are used to access the three-dimensional LUT. Two values are accessed. The color itself to be printed, and the error between the table address and the CMY value of the color to be printed.

The palette entry is printed, and the total error to be propagated is computed. The error is formed in two components as seen above. The first component, derived from the three one-dimensional LUTs, represents the error between the input pixel and the three-dimensional table address. The second error term represents the error between the three-dimensional table address and the palette color itself. The sum of these two terms represents the error between the input pixel and the CMY of the palette entry. This error term is propagated to surrounding pixels.

There are two main challenges when applying device-state error diffusion to a multiink, multidrop product:

The first is constructing an optimal palette of colors. We considered total ink usage, graininess, visual separation between colors, balanced use between channels, etc. For example, our error diffusion for photo-like media uses only a few hundred of the 2500 available eight-or-fewer- drop colors available to it.

Second, once a palette is chosen, we must assign a mapping of device space CMY to the six-color ink space ($C_D C_L M_D M_L YK$) in which our palette is defined. This mapping needs to take into account the visual spacing of the colors, rate of change of colors, and relative spacing.

There are several reasons for using device-state error diffusion:

Ink limiting: Because all possible output colors of the error-diffusion process are defined in the color palette, we can design the ink limiting into the palette in advance. This is useful in two ways. With this method, there is no run-time computation for ink limiting. When changing print modes for different medias, one simply downloads a new error-diffusion table built with a suitable palette. For example, glossy-photo-media printmodes use a palette generated with palette entries having eight drops per pixel or less. Photo-project-paper printmodes use palette entries with six drops or less, plain paper, four drops or less. In addition, since all possible output colors of the error-diffusion process are contained in the palette, we can know in advance that no pixel will exceed a drop limit. It is difficult to make the same guarantees in independent-plane halftoning.

Performance: For performance reasons, we decided to perform halftoning in hardware. We considered three main methods for halftoning—including dithering and two error-diffusion methods. Dithering using large dither cells provided a simple, economical alternative to hardware implementation but, when compared with error diffusion, it did not meet quality expectations. The two error-diffusion techniques were six-channel-ink-space and device-state error diffusion.

Device-state error diffusion compared with six-plane error diffusion:

Six-plane error diffusion is a technique in which a conversion is made from the native CMY space to six-color ink space. The values in ink space represent 0.0 to N.0 drops of ink for each of the six channels. Error diffusion halftones each of the six channels independently. For example, an output of $C_D=2.33$ would cause on average two pixels containing two drops of $C_D$ to be printed for each pixel of three drops of $C_D$. An algorithm combined with a set of configuration tables define the translation from CMY to $C_D C_L M_D M_L YK$. This conversion is too computationally complex to be performed for each pixel at run time. One solution is to resample the function into a three-dimensional lookup/interpolation table. This table would be accessed in much the same way as a standard color map, except that it would have three-dimensional input (CMY) and six-dimensional output ($C_D C_L M_D M_L YK$).

Six-plane error diffusion:

Pro's:

There is very little correlation between the six planes—which minimizes halftoning patterns.

White-to-black neutral ramp is easy to define and construct, and easy to make it neutral.

Con's:

Per pixel ink limiting is difficult, although maximum usage on average over an area is controllable.

Some areas of the color space are rendered with more grain than needed, due in large part to the generation of locally noncorrelated color planes.

It is difficult to construct a CMY-to-six-color mapping which satisfies all the constraints.

This would have added an additional several dollars for miscellaneous hardware.

Device-state error diffusion

Pro's:

This system minimizes grain by using only palette colors visually close to the desired output color.

Exact control over printed dot combinations is obtained on a per-pixel basis.

Ink limiting is precomputed; no run-time effort is involved.

Since error diffusion is done in CMY space instead of ink space, it reduces a six-channel problem to a three-channel problem.

It is easy to implement in hardware—which need know nothing of printmodes and is entirely driven by downloadable tables.

Con's:

It was difficult to make the white-to-black neutral ramp appear neutral without the aid of a color map. A noncolormapped gray ramp typically had a small color cast in the lighter grays.

Color control was more difficult. A large region inside the gamut was devoid of palette entries. This "hole" ran along the neutral ramp from the midtones to near white. Adding a light-yellow ink would have added more palette entries to fill this hole, although it would not have been needed to reduce yellow-induced halftone grain.

Our first proof of concept for device-state error diffusion showed acceptable quality except for areas with smooth and slowly changing color gradients. Early attempts to correct this were met with only slow incremental progress.

We began to question whether device-state error diffusion could actually render smooth gradients. We suspected that the contouring was a result of errors and inaccuracies in the CMY-to-six-color mapping for the palette entries.

To demonstrate that a correct mapping would not cause contouring, we developed a method to show potential on a Fujix Pictograpy photo printer. We chose a palette with a similar number of colors to what we had been using in our development work, and assigned the input values for each palette entry to be the same. The output was the same CMY value. The original test used about three hundred eighty colors.

The net effect of applying this modified device-state algorithm to the Fujix was that instead of printing from its full range of sixteen million colors, it printed from our three hundred eighty colors. This experiment showed that there was no systematic contouring or issues in the output quality. As a result we focused our attention on how to build the palette and assign CMY values to it.

Before formulating our first halftone table we set these goals:

Generate a smooth transition across the whole CMY space.

Watch out for granularity variation across the gamut.

Generate good neutral color without a color map.

Implement an optimal GCR algorithm.

Maintain good secondary device colors (red, green, blue).

Balance ink usage across chambers.

Various ways to generate device-state tables have been tested. They can be classified as model-based methods, measurement-based methods, and combination methods. The table must associate/relate a three-dimensional coordinate system (CMY) with a six-dimensional coordinate system (six ink chambers) while inducing specific behavior in the color space.

Model-based methods assign CMY values based on a certain model or assumption, which interrelates all or some of the device states. For example: one drop of dark cyan has the same C value as five drops of light cyan, one light cyan plus one dark magenta has the C value of one light cyan and M value of one dark magenta. Only the amount of ink put on the media is considered. The interaction between inks and media, and other complicated physical effects, are ignored. In this regard we studied the Kubelka-Munk model to find a better relationship between various ink combinations.

Measurement-based methods assign CMY values to all device states based on their color measurements, no matter what contributes to the appearance of the color. All the possible device states are printed and measured. One of our such attempts used device states with certain limits (total ink number, black ink number). They formed a volume with eight corners (white, black, C, M, Y, R, G, B). We then morphed this volume into a perfect cube in CMY space. The result was not satisfactory. The size of inkdrops in a uniform unhalftoned tile was different from that in a halftoned pattern, due to the different loadings of the inkjet pens in the various cases. Other factors also contributing to nonsmoothness included inaccuracy of measurement, and nonlinear nature of CIELAB space and morphed space.

The methodology described in this document for generation of our current halftone tables is a combination method. It is relatively simple and reliable.

The C, M, Y values for primary color ramps (C, M, Y) are generated based on measurement results. An assumption is made that CMY inks always have the same C, M, Y value as they have in corresponding primary color ramps. None of the complicated interactions between different ink channels and between ink and media are considered. We believe that they have minor effect in comparison with the amount of ink put on the printing media.

STRUCTURE OF THE APPENDIX

The two device-state tables are printouts from database or spreadsheet files entitled "plainp.tbl" (meaning "plain-paper table") and "glossy.tbl" respectively. Each table has $17^3$= 4913 rows.

In each table the first three column headings "ci", "mi" and "yi" (simplified formatting of $c_i$, $m_i$, and $y_i$ respectively) are the CMY values for the major entries. The next three headings "C", "M" and "Y" are the state values for the device state chosen for the major entry.

Next following are six column headings "Cd" (corresponding to $C_D$ in the foregoing text, representing dark cyan), "Cl" (for $C_L$, light cyan), "Md" (for $M_D$), "Ml" ($M_L$) and "Y" and "K". These columns contain the drop numbers for each of the six channels.

The table includes actual errors between the device state and the major entry, in the columns headed "Ce", "Me" and "Ye" (for $C_e$, $M_e$ and $Y_e$) meaning error in the cyan, magenta and yellow color planes respectively. In one optimum storage/throughput tradeoff, the amount in each of these columns is not the total error value for the respective color, but only one-fourth of that total: when the table is used in this form, each of the four neighboring pixels in common will receive error distributions exactly in the amount tabulated, thereby eliminating the need to divide by four before distributing the error fractions.

Unless otherwise clear from the context, it is within the scope of the appended claims to distribute to each pixel either a common fraction such as one-fourth of the total error, or varying fractions such as for example the values 7/16, 1/16, 5/16 and 3/16 familiar in the literature, or other fragments as preferred. Of course it is straightforward, in view of the foregoing disclosure, to precompute and pretabulate these fragments.

If the tabulation were to include these subdivided error fragments for distribution in the error-diffusion process, three additional error columns would appear for each color as described above in conjunction with FIG. 11. It is also within the scope of the claimed invention to calculate the errors in real run time if desired.

The above disclosure is intended as merely exemplary, and not to limit the scope of the invention—which is to be determined by reference to the appended claims.

Claims reciting "either or both" of two conditions criteria, etc., encompass procedures in which one or the other of the stated alternatives is never employed—as well as, of course, procedures in which each alternative is sometimes employed, and procedures in which sometimes both alternatives are employed.

What is claimed is:

1. A procedure for forming color look-up tables said procedure comprising the steps of:

photometrically measuring three printed ramps for respectively different basic colorant colors;

using substantially exclusively the ramp photometric measurements to establish at least an initial version of a transform from three-dimensional color coordinates to a six-or-more-colorant system in the printer; and storing the transform to facilitate forming of desired color images.

2. The procedure of claim 1:

further comprising the step of also photometrically measuring a limited number of other, supplemental colorant-set combinations that correspond to colors selected from the group consisting of:
substantially pure secondary colors, and
black; and wherein the using step comprises employing exclusively the ramp photometric measurements and the supplemental photometric measurements to complete at least an initial version of the transform.

3. The procedure of claim 2, further comprising the steps of:

using a completed initial version of the transform to print a series of substantially neutral colors;

photometrically measuring the printed series of substantially neutral colors; and using the photometric measurements of the substantially neutral colors to refine the transform.

4. The procedure of claim 1, wherein the using step comprises:

establishing indices related to each of three independent color coordinates respectively;

defining entries and major entries, based on the indices;

choosing, for inclusion in a palette, colorant-set combinations that satisfy one or more selection rules; whereby the chosen colorant-set combinations with their associated entries become device states; and then assigning a device state to each major entry.

5. The procedure of claim 4, wherein the using step further comprises:

constructing a tabulation of the major entries in association with selected nearby entries, for access to the major entries by reference to those associated entries.

6. The procedure of claim 5, wherein:

said tabulation is not monotonic with respect to the nearby entries.

7. The procedure of claim 5, wherein the using step further comprises:

forming a set of three one-dimensional lookup tables for use in locating major entries through their respectively associated entries;

wherein each one-dimensional lookup table comprises the indices; and said nearby entries, tabulated for access to the major entries, correspond to concatenation of respective indices from the three tables.

8. The procedure of claim 1, wherein:

the storing step comprises storing the transform as a color lookup table.

9. The procedure of claim 1, wherein:

the storing step comprises storing the transform as an information file from which a color lookup table can be formed automatically.

10. The procedure of claim 1, wherein:

the transform is for use in error diffusion.

11. The procedure of claim 1, wherein:

at least the printing and using steps are performed substantially automatically by a processor.

12. Lookup tables formed by the procedure of claim 1.

13. A procedure for forming color look-up tables for automated reference by an automatic system, in printing of desired color images; said procedure comprising the steps of:

establishing a multiplicity of colorant-set combinations as candidates for selection to serve as device states;

forming black-replacement combinations from at least some of the colorant-set combinations, subject to either or both of these conditions:
maintaining an amount of chromatic colorant, ideally light colorant, in each pixel with black colorant, and modification of usage patterns to avoid alternative usage of composite black vs. black colorant;

selecting some of the black-replacement combinations and some other ones of the colorant-set combinations to serve as device states; and storing the device states.

14. The procedure of claim 13, wherein:

said maintaining condition tends to form or preserve smooth transitions; and said modification condition operates by fuzzy logic and tends to avoid exhaustion of light colorant.

15. The procedure of claim 13, further comprising the steps of:

associating entries with the established multiplicity of colorant-set combinations; and after the selecting step, associating or reassociating at least some of the entries with corresponding black-replacement combinations.

16. The procedure of claim 13, wherein the forming step is also subject to the condition of:

modification of colorant color-coordinate values to account for inexactness of composite black equivalence to black colorant, particularly depending on distance from a black corner.

17. The procedure of claim 13, wherein:

at least the establishing, forming and selecting steps are performed substantially automatically by an automatic processor.

18. A procedure for forming color look-up tables for automated reference by an automated system, in printing of desired color images on a printing medium; said procedure comprising the steps of:

establishing a multiplicity of colorant-set combinations as candidates for selection to serve as device states;

forming black-replacement combinations from at least some of the colorant-set combinations, subject to the condition that colorant replacement is permitted only if at least a specified quantity of composite black is available for replacement;

selecting some of the black-replacement combinations and some other ones of the colorant-set combinations to serve as device states; and storing the device states.

19. The procedure of claim 1, wherein:

the specified quantity of composite black is equivalent to two quanta of black colorant.

20. The procedure of claim 19, wherein:

the specified quantity of composite black is equivalent to two drops of black ink.

21. The procedure of claim 19, wherein:

the forming step replaces less than the entire specified quantity of composite black.

22. The procedure of claim 19, wherein:

at least the establishing, forming and selecting steps are performed substantially automatically by an automatic processor.

23. Lookup tables formed by the procedure of claim 19.

24. A procedure for forming color look-up tables for automated reference by an automated system, in printing of desired color images on a printing medium by a printer that has a gamut; said procedure comprising the steps of:

establishing a multiplicity of colorant-set combinations as candidates for selection to serve as device states;

eliminating colorant-set combinations which violate either or both of these required conditions:
  (a) presence of a companion light colorant quantum with each dark colorant quantum, and
  (b) small changes in number of colorant quanta per pixel, in each colorant transition within the printer gamut;

selecting remaining colorant-set combinations to serve as device states; and storing the device states in.

25. The procedure of claim 24, wherein the eliminating step also eliminates combinations which violate either or both of these conditions:
  (c) a limit on the maximum number of colorant quanta of all colors, per pixel; and
  (d) a limit on the maximum numbers of quanta of each colorant color respectively, per pixel.

26. The procedure of claim 25, wherein:

eliminations based on condition (a) are subject to the constraint that a colorant combination required by condition (a) must satisfy both conditions (c) and (d).

27. The procedure of claim 24, wherein:

in condition (b), "small change" means a change by no more than two colorant quanta.

28. The procedure of claim 24, wherein:

at least the establishing, eliminating and selecting steps are performed substantially automatically by an automatic processor.

29. Lookup tables formed by the procedure of claim 24.

30. A procedure for forming color look-up tables for automated reference by an automated system, in printing of desired color images on a printing medium by a printer that has a gamut, said gamut having a surface and a neutral axis, and said gamut and neutral axis having a dark end; said procedure comprising the steps of:

defining a multiplicity of major entries;

establishing a multiplicity of device states for use in printing, said multiplicity of device states being smaller in number than said multiplicity of major entries;

then assigning one device state to each major entry, based in part upon either or both of these criteria:
  near the gamut surface, favoring or requiring device states that are relatively close to the surface in preference to device states that are relatively close to the desired major entry, unless the surface is near the dark end of the gamut, and
  near the neutral axis and particularly at the dark end of that axis, favoring or requiring colors that contain real black colorant; and storing the device states, associated with their respective assigned major entries.

31. The procedure of claim 30, wherein the assigning step is also based in part upon this criterion:

closeness of states to each major entry.

32. The procedure of claim 30, wherein:

the term "favoring" means using weighting factors that respectively increase the influence of metrics sensitive to distance in color space from the surface and to real-black-colorant content, or decrease the influence of metrics sensitive to distance from a major entry; and the term "near" means applying a threshold to said using of weighting factors.

33. The procedure of claim 32, wherein:

said "requiring" criterion disqualifies device states with color coordinate greater than five or less than 248, on a scale of zero to 255, for major entries at the neutral and maximum conditions respectively.

34. A procedure for forming color look-up tables for automated reference by an automated system, in printing of desired color images on a printing medium by a printer that has a gamut, said gamut having a surface and a neutral axis, and said gamut and neutral axis having a dark end; said procedure comprising the steps of:

defining a multiplicity of major entries;

establishing a multiplicity of device states for use in printing, said multiplicity of device states being smaller in number than said multiplicity of major entries;

then assigning one device state to each major entry, based in part upon either or both of these criteria:
  near the gamut surface, favoring or requiring device states that are relatively close to the surface in preference to device states that are relatively close to the desired major entry, unless the surface is near the dark end of the gamut, and
  near the neutral axis and particularly at the dark end of that axis, favoring or requiring colors that contain real black colorant; and storing the device states, associated with their respective assigned manor entries; and wherein:

the term "favoring" means using weighting factors that respectively increase the influence of metrics sensitive to distance in color space from the surface and to real-black-colorant content, or decrease the influence of metrics sensitive to distance from a major entry; and the term "near" means applying a threshold to said using of weighting factors; and a weighting factor for presence of one quantum of real black colorant is:

$1+2\epsilon$ if $\epsilon$ exceeds 0.5 and the device state has NO real black, and $1+1/\epsilon$ if $\epsilon$ is less than 0.5 and the device state HAS real black, where $$\varepsilon = \left( \frac{\lambda \min(C_{ME}, M_{ME}, Y_{ME}) + \mathrm{mid}(C_{ME}, M_{ME}, Y_{ME})}{255(\lambda + 1)} \right)^{1.8}$$

$C_{ME}$, $M_{ME}$, and $Y_{ME}$ are major-entry coordinates, and $\lambda$ is in a range from 0.1 to 10 inclusive.

35. The procedure of claim 32, wherein:

the threshold for nearness to the gamut surface is substantially zero.

36. A procedure for forming color look-up tables for automated reference by an automated system, in printing of desired color images on a printing medium by a printer that has a gamut, said gamut having a surface and a neutral axis, and said gamut and neutral axis having a dark end; said procedure comprising the steps of:

defining a multiplicity of major entries;

establishing a multiplicity of device states for use in printing, said multiplicity of device states being smaller in number than said multiplicity of major entries;

then assigning one device state to each major entry, based in part upon either or both of these criteria:
  near the gamut surface, favoring or requiring device states that are relatively close to the surface in preference to device states that are relatively close to the desired major entry, unless the surface is near the dark end of the gamut, and
  near the neutral axis and particularly at the dark end of that axis, favoring or requiring colors that contain real black colorant; and
storing the device states, associated with their respective assigned major entries; and wherein:
  the term "favoring" means using weighting factors that respectively increase the influence of metrics sensitive to distance in color space from the surface and to real-black-colorant content, or decrease the influence of metrics sensitive to distance from a major entry; wherein:
    the threshold for nearness to the gamut surface is substantially zero; and
    subject to said criteria, color differences are calculated in proportion to:

$$f[(C_{ME}-C_{DS})^2+(C_{ME}-C_{DS})^2]+(Y_{ME}-Y_{DS})^2,$$

where f is in a range from one through ten inclusive.

37. The procedure of claim 30, wherein:
cyan and magenta differences are weighted more heavily than yellow differences.

38. The procedure of claim 30, wherein:
at least the defining, establishing and assigning steps are performed substantially automatically by an automatic processor.

39. Lookup tables formed by the procedure of claim 30.

40. A procedure for constructing color look-up tables for automated reference by an automated system, in printing of desired color images on a printing medium; said procedure comprising the steps of:
  defining a multiplicity of major entries;
  establishing a multiplicity of device states for use in printing, said multiplicity of device states being smaller in number than said multiplicity of major entries;
  then assigning one device state to each major entry;
  forming a set of preferably one-dimensional lookup tables for locating major entries based upon an input-color specification; and
  storing the device states, associated with their respective assigned major entries, and the one-dimensional lookup tables in nonvolatile memory.

41. The procedure of claim 40, wherein:
the storing step comprises storing either or both of (a) the device states with associated major entries and (b) the one-dimensional lookup tables, in the form of lookup tables.

42. The procedure of claim 40, wherein:
the storing step comprises storing either or both of (a) the device states with associated major entries and (b) the one-dimensional lookup tables, in the form of information files from which lookup tables can be formed automatically.

43. The procedure of claim 40, wherein:
the one-dimensional lookup tables are not monotonic in assignment of major entries to indices.

44. The procedure of claim 43, wherein:
the forming and storing steps comprise associating pre-computed error-diffusion error distributions with indices in said lookup tables.

45. The procedure of claim 40, wherein:
the forming and storing steps comprise associating pre-computed error-diffusion error distributions with indices in said lookup tables.

46. The procedure of claim 45, for use in constructing tables for use with plural media; and wherein:
the associating step comprises associating different pre-computed error-diffusion error distributions with the indices, in lookup tables for use with different media respectively.

47. The procedure of claim 40, wherein:
at least the defining, establishing, assigning and forming steps are performed substantially automatically by an automatic processor.

48. Lookup tables formed by the procedure of claim 40.

49. A procedure for forming color look-up tables for automated reference by an automated system, in printing of desired color images on a printing medium; said procedure comprising the steps of:
  establishing a multiplicity of device states for use in printing;
  then formulating a device-state lookup table, comprising (a) the device states in conjunction with (b) means for accessing the device states based upon input color specifications;
  then using the device-state lookup table to selectively print a multiplicity of halftone colors that are nominally neutral according to the device-state table;
  then photometrically measuring the printed halftone colors to obtain measured colorimetric values;
  then applying the measured calorimetric values to adjust the accessing means to achieve an adjusted device-state lookup table having an improved neutral ramp; and
  storing the adjusted device-state lookup table.

50. The procedure of claim 49, wherein:
the establishing step comprises:
  printing and photometrically measuring colorant sets, defining colorant-set combinations, and
  selecting certain of the colorant-set combinations to serve as device states; and
the formulating step comprises:
  defining indices that are automatically selectable on the basis of input color specifications,
  defining a multiplicity of entries, formed by concatenation of the indices for three color dimensions,
  defining from the multiplicity of entries a smaller multiplicity of major entries, and means for accessing the major entries based upon the indices, and
  assigning one device state to each major entry.

51. The procedure of claim 49, wherein:
the using step comprises printing preferably at least thirty-two nominally neutral colors.

52. The procedure of claim 49, wherein:
the applying step comprises effectuating a generally consistent proportional adjustment or at least a smoothly varying adjustment, for substantially all the device states.

53. The procedure of claim 49, wherein:
at least the establishing, formulating, using, measuring and applying steps are performed substantially automatically by an automatic processor.

54. Lookup tables formed by the procedure of claim 49.

55. A procedure for forming color look-up tables for automated reference by an automated system, in printing of desired color images on a printing medium by a printer having a colorant system of six or more colorants; said procedure comprising the steps of:

printing and photometrically measuring three ramps for respectively different pure secondary colors available in the printer;

using substantially exclusively the ramp photometric measurements to establish at least an initial version of a transform from three-dimensional color coordinates to the six-or-more-colorant system in the printer; and storing the transform in nonvolatile memory.

56. The procedure of claim 55:

further comprising the step of also printing and photometrically measuring a limited number of other, supplemental colorant-set combinations that correspond to colors selected from the group consisting of:
primary colors, and
black; and wherein the using step employs exclusively the ramp photometric measurements and the supplemental photometric measurements to complete at least an initial version of the transform.

57. The procedure of claim 55, further comprising the steps of:

using a completed initial version of the transform to print a series of substantially neutral colors;

photometrically measuring the printed series of substantially neutral colors; and using the photometric measurements of the substantially neutral colors to refine the transform.

58. The procedure of claim 55, wherein:

at least the establishing, formulating, using, measuring and applying steps are performed substantially automatically by an automatic processor.

59. Lookup tables formed by the procedure of claim 55.

60. A procedure for forming color look-up tables for automated reference by an automatic system, in device-state inkjet printing of desired color images; said procedure comprising the steps of:

establishing a multiplicity of colorant-set combinations, inclusive of all possible color combinations in a set of substantially different colors, as candidates for selection to serve as device states;

forming black-replacement combinations from at least some of the colorant-set combinations;

selecting some of the black-replacement combinations and some other ones of the colorant-set combinations to serve as palette colors; and storing the device states for use in the look-up tables.

61. The procedure of claim 13, wherein:

said storing step comprises storing the device states in nonvolatile memory.

62. The procedure of claim 19, wherein:

said storing step comprises storing the device states in nonvolatile memory.

63. A procedure for forming color look-up tables for automated reference by an automated system, in device-state inkjet printing of desired color images on a printing medium; said procedure comprising the steps of:

establishing a multiplicity of colorant-set combinations, inclusive of all possible color combinations in a set of substantially different colors, as candidates for selection to serve as device states;

eliminating at least some of the colorant-set combinations;

selecting some remaining colorant-set combinations that remain to serve as device states; and storing the device states.

64. The procedure of claim 24, wherein:

said storing step comprises storing the device states in nonvolatile memory.

65. A procedure for forming color look-up tables for automated reference by an automated system, in device-state inkjet printing of desired color images on a printing medium; said procedure comprising the steps of:

defining a multiplicity of major entries, inclusive of all possible color combinations in a set of substantially different colors;

establishing a multiplicity of device states for use in printing, said multiplicity of device states being smaller in number than said multiplicity of major entries;

then assigning one device state to each major entry; and storing the device states.

66. The procedure of claim 30, wherein:

the storing state comprises storing the device states in nonvolatile memory.

67. The procedure of claim 49, wherein:

the storing state comprises storing the device states in nonvolatile memory.

* * * * *

UNITED STATES PATENT AND TRADEMARK OFFICE
CERTIFICATE OF CORRECTION

PATENT NO. : 6,178,008 B1
DATED : January 23, 2001
INVENTOR(S) : Bockman et al.

It is certified that error appears in the above-identified patent and that said Letters Patent is hereby corrected as shown below:

Column 29,
Line 18, after "storing the device states", delete "in".

Signed and Sealed this

Thirtieth Day of April, 2002

*Attest:*

*Attesting Officer*

JAMES E. ROGAN
*Director of the United States Patent and Trademark Office*